(12) United States Patent
Kanterakis

(10) Patent No.: US 7,301,988 B2
(45) Date of Patent: Nov. 27, 2007

(54) ENHANCED UPLINK PACKET TRANSFER

(75) Inventor: Emmanuel Kanterakis, North Brunswick, NJ (US)

(73) Assignee: Golden Bridge Technology, Inc., Long Branch, NJ (US)

( * ) Notice: Subject to any disclaimer, the term of this patent is extended or adjusted under 35 U.S.C. 154(b) by 710 days.

(21) Appl. No.: 10/678,648

(22) Filed: Oct. 6, 2003

(65) Prior Publication Data

US 2004/0131106 A1 Jul. 8, 2004

Related U.S. Application Data

(60) Provisional application No. 60/416,256, filed on Oct. 7, 2003.

(51) Int. Cl.
*H04B 1/707* (2006.01)

(52) U.S. Cl. .................. 375/141; 370/394; 370/913

(58) Field of Classification Search ............... 375/141; 455/466; 370/394, 469, 913
See application file for complete search history.

(56) References Cited

U.S. PATENT DOCUMENTS

| | | | |
|---|---|---|---|
| 5,734,646 A | 3/1998 | I et al. | |
| 6,078,572 A | 6/2000 | Tanno et al. | |
| 6,178,337 B1 * | 1/2001 | Spartz et al. | 455/561 |
| 6,240,083 B1 | 5/2001 | Wright et al. | |
| 6,320,851 B1 | 11/2001 | Kim et al. | |
| 6,526,030 B2 | 2/2003 | Rezaiifar et al. | |
| 6,636,723 B1 * | 10/2003 | Kitagawa et al. | 455/69 |
| 6,661,777 B1 | 12/2003 | Blanc et al. | |
| 6,668,175 B1 | 12/2003 | Almgren et al. | |
| 6,678,249 B2 | 1/2004 | Toskala et al. | |
| 7,075,907 B1 * | 7/2006 | Lintulampi | 370/329 |
| 2002/0021698 A1 | 2/2002 | Lee et al. | |
| 2002/0045458 A1 | 4/2002 | Parantainen et al. | |
| 2002/0061012 A1 * | 5/2002 | Thi et al. | 370/352 |
| 2002/0183064 A1 * | 12/2002 | Gopalakrishnan et al. | 455/452 |
| 2003/0103476 A1 * | 6/2003 | Choi et al. | 370/329 |
| 2004/0005887 A1 * | 1/2004 | Bahrenburg et al. | 455/422.1 |
| 2004/0204079 A1 * | 10/2004 | Hamdi | 455/557 |

OTHER PUBLICATIONS

L.B. Milstein, "Wideband Code Division Multiple Access", IEEE Journal of Selected Areas in Communications, vol. 18, No. 8, Aug. 2000, pp. 1344-1354.

A. Fukasawa et al., "Wideband CDMA System for Personal Radio Communications", IEEE Communications Magazine, Oct. 1996, pp. 116-123.

E. Dahlman et al., "UMTS/IMT-2000 Based on Wideband CDMA", IEEE Communications Magazine, Sep. 1998, pp. 70-80.

(Continued)

*Primary Examiner*—Temesghen Ghebretinsae
(74) *Attorney, Agent, or Firm*—McDermott Will & Emery LLP

(57) ABSTRACT

An enhanced spread-spectrum uplink technique provides more efficient packet transfer in a wireless network. A mobile station requests to utilize an uplink channel, typically, a physical dedicated channel. If the network will grant access, a base station sends back a channel-request-granted message, which specifies a transmission start time and length. The base station starts related downlink transmissions at the start time, and at a time thereafter, the mobile station starts sending packet data over the uplink physical dedicated channel. After a transmission of no more that the specified length, the mobile station ceases its uplink transmission on the dedicated channel, and the base station and/or the mobile station can immediately release one or more channel resources. The grant message and/or the subsequent signaling communications from the base station may also specify a modulation scheme and a channelization code for the uplink channel.

17 Claims, 18 Drawing Sheets

Base Station (Node-B) Tranceiver for Enhanced Uplink Packet Communications.

OTHER PUBLICATIONS

M.Y. Choi et al., "A CPCH Access Method for Prioritized Services in W-CDMA", IEEE Communications Letters, vol. 8, No. 1, Jan. 2004, pp. 9-11.

M. Sawahashi et al., "Enhanced Wireless Access Technologies and Experiments for W-CDMA Communications", IEEE Personal Communications, Dec. 2000, pp. 6-16.

F. Adachi et al., "Wideband DS-CDMA for Next-Generation Mobile Communications Systems", IEEE Communications Magazine, Sep. 1998, pp. 56-69.

TIA/EIA: "TIA/EIA/IS-2001-A." <http://www.tiaonline.org/standards/sfg/imt2k/cdma2000/TIA-EIA-IS-2001-A.pdf> Aug. 31, 2001, pp. 278-280, 820-822.

* cited by examiner

Fig. 2 EP-UL Packet Transfer Protocol (PTP)

Fig. 3 EP-UL Packet Transfer Protocol

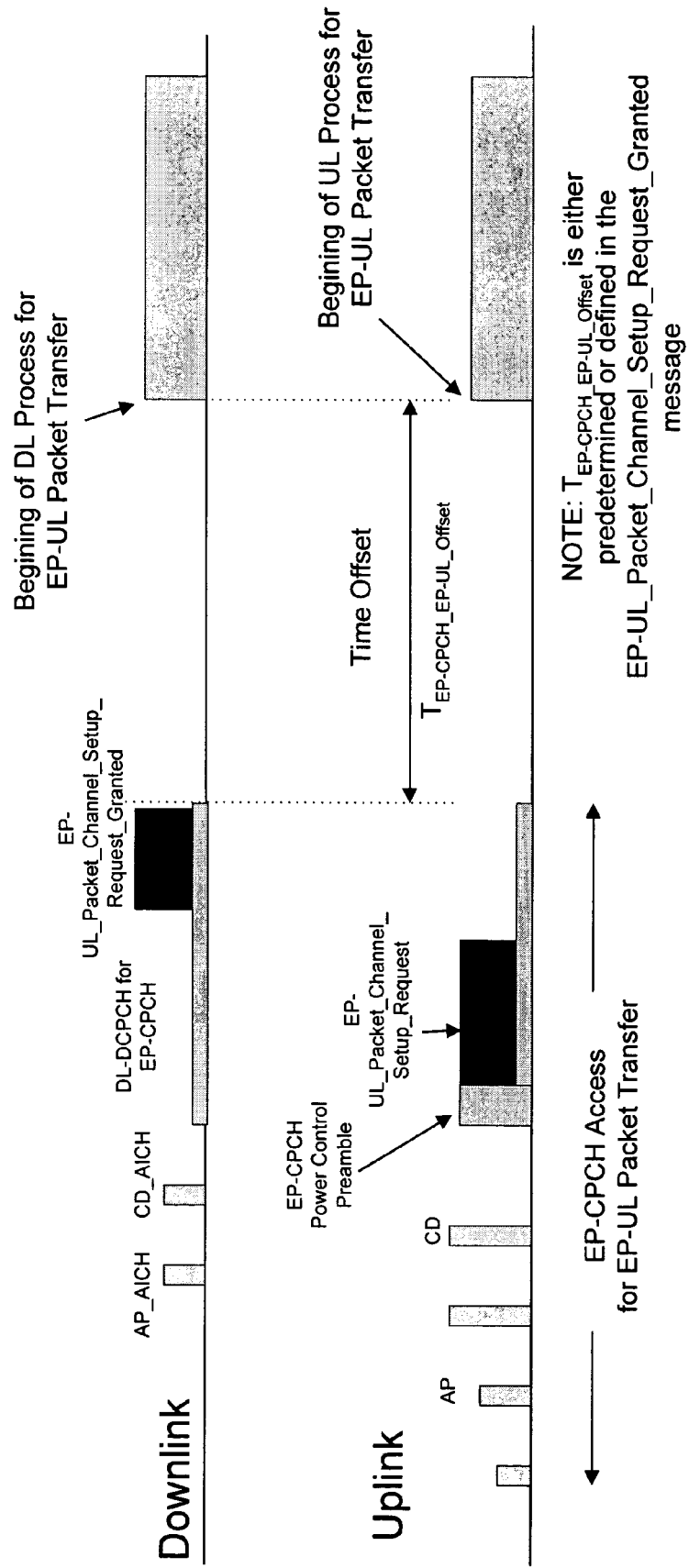
Fig. 14 EP-UL Packet Transfer Protocol (PTP) Using EP-CPCH for Initial Procedure Setup.

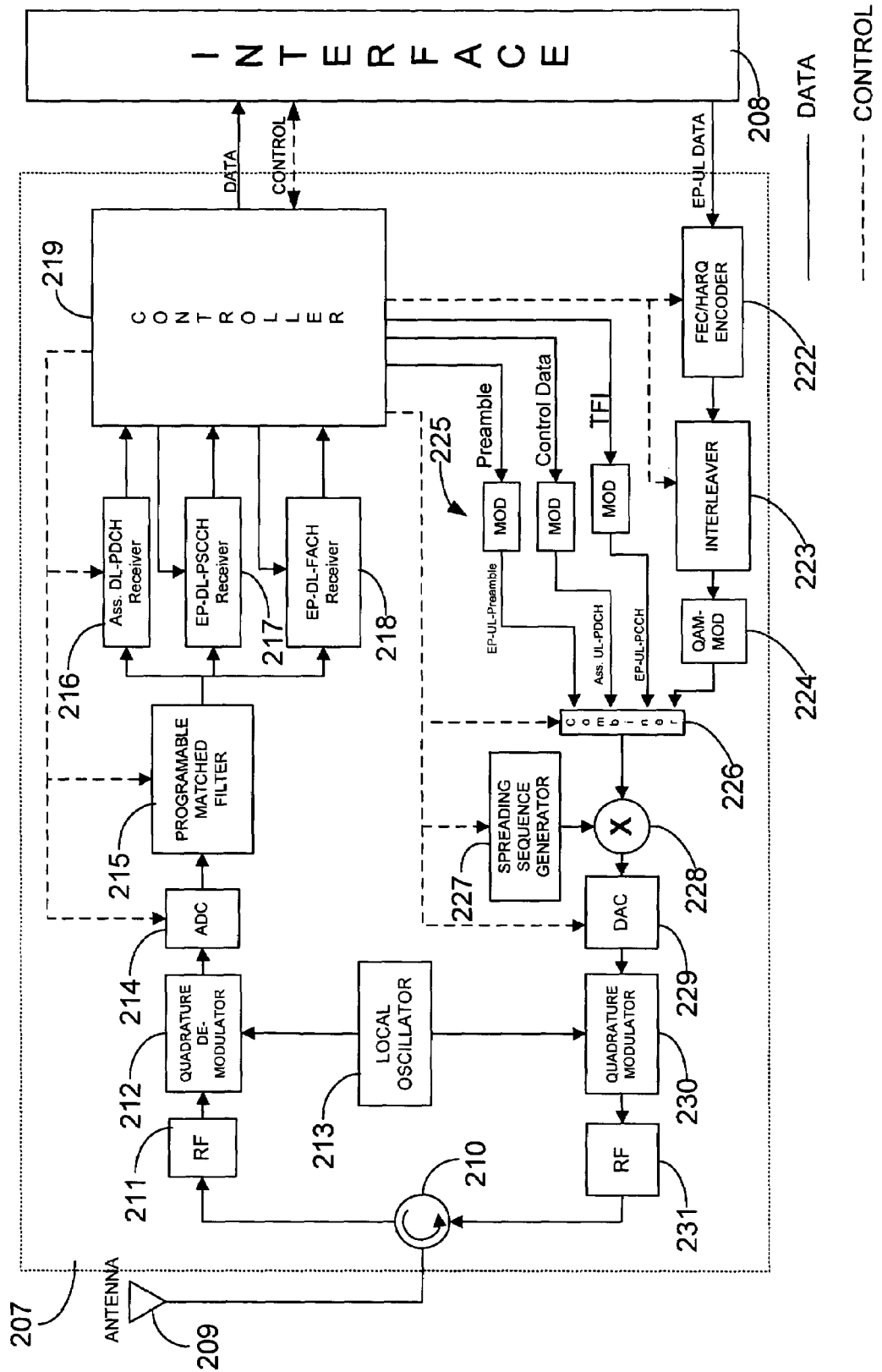
Fig. 15 Remote Station Tranceiver for Enhanced Uplink Packet Communications.

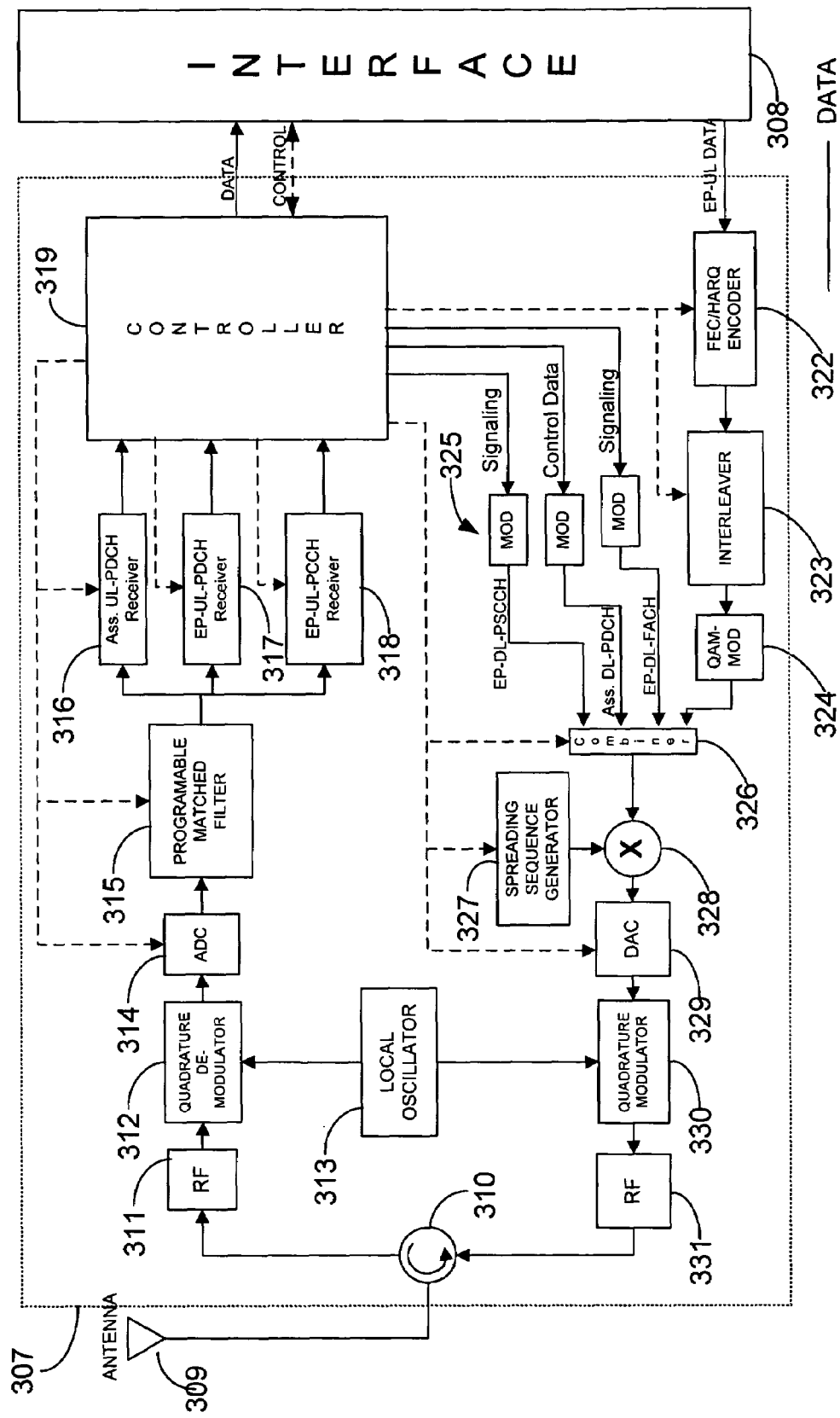
Fig. 16 Base Station (Node-B) Tranceiver for Enhanced Uplink Packet Communications.

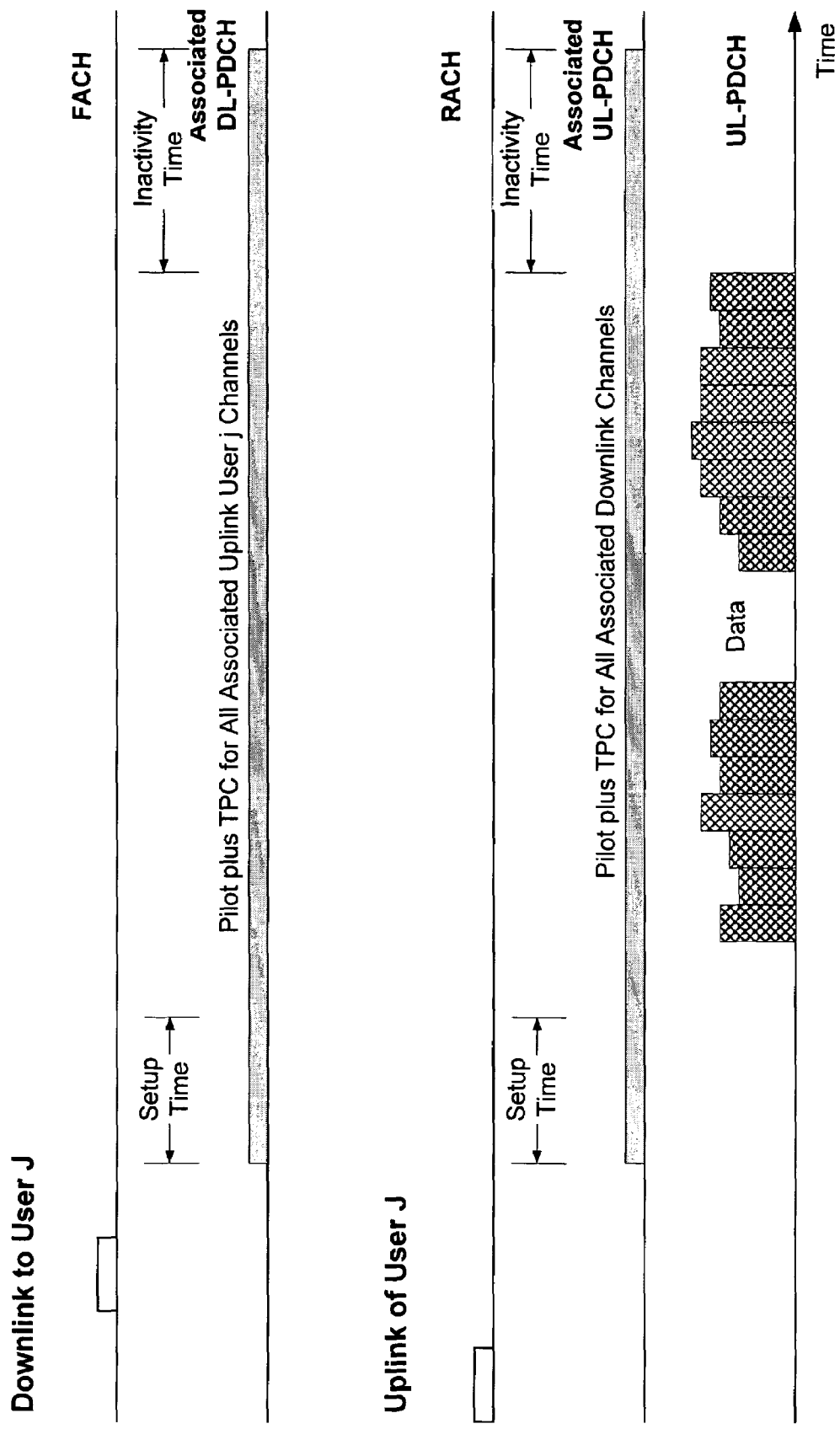
FIG. 17  UL DCH Packet Transfer Protocol (Prior Art)

ENHANCED UPLINK PACKET TRANSFER

RELATED APPLICATIONS

This application claims the benefit of U.S. Provisional Application No. 60/416,256 Filed Oct. 7, 2003 entitled "Enhanced Uplink Packet Transfer Method," the disclosure of which is entirely incorporated herein by reference.

TECHNICAL FIELD

The present subject matter relates to techniques and equipment for wireless spread-spectrum communications, and more particularly for implementation in code-division-multiple-access (CDMA) cellular, packet-switched communication systems. In a spread-spectrum system, comprising a plurality of base stations and a plurality of remote stations, the subject matter particularly relates to techniques and/or equipment for enhancing the performance of one or more of the dedicated uplink packet channels.

BACKGROUND

Recent developments in wireless communications technologies have allowed expansion of service offerings from the original voice telephone service model to include a number of services supporting packet data communications, including for broadband applications. As customers become increasingly familiar with data services offered through landline networks, they are increasingly demanding comparable data communications in the wireless domain, for example to maintain service while mobile subscribers roam freely or to provide remote service in locations where wireless loops are preferable to landline subscriber loops. A number of technologies support packet data communications in the wireless domain.

Under the currently proposed W-CDMA technical specification, there is a dedicated transport channel, the Dedicated Channel (DCH), which can be either a downlink or an uplink transport channel. The DCH is the channel of choice in services where long delays cannot be tolerated, e.g. for low delay constrained packet services and services which require longer than 640 ms packet transmission times. The DCH is also the preferred channel for certain network protocol methods, like TCP/IP, which operate much more efficiently under small packet delays rather than long ones.

However, the current uplink DCH, as with any circuit-switched packet channel, requires a lot of overhead resources. As shown in FIG. 17, under the current uplink DCH method, once a link is set up between a user j and the base station, the communication will require an associated uplink physical dedicated channel (Associated UL-PDCH) and an associated downlink physical dedicated channel (Associated DL-PDCH) for closed-loop power control. When communications for the user j start on these two associated channels, there is a period of time when the base station is still attempting to lock in on the Associated UL-PDCH from user j, during which no data can be transferred to the base station yet. This period of time is called the set-up time. The length of this delay is indeterminate and varies depending on how long it takes for the base station to lock onto the Associated UP-PDCH. After the data is sent from user j to the base station, there is again a period of time called the inactivity time before the two associated channels are released. Also, under the current uplink DCH method, while the data is power-controlled, it does not adapt its modulation, coding and channelization code according to the quality of the link, resulting in additional wastage.

Hence a need exists for a technique to deal with these deficiencies in the current uplink DCH.

SUMMARY

The concepts disclosed herein alleviate the above noted problems with the current uplink DCH. The concepts and improvements described herein can also be generalized and applied to similar channels in other packet-switched communication systems.

The techniques and network equipment discussed here introduce an uplink transmission method for a more efficient packet transfer. Hence a general objective is to remove the inefficiencies associated with the current UL DCH method.

Another objective is to provide a fast mechanism to control the modulation, coding and/or the channelization code of data transmission based on the quality of the link A further objective is to provide a fast mechanism to facilitate the base station in detecting the Associated UL-PDCH and therefore shortening the set-up time.

A further objective is to reduce the power of the Associated UL-PDCH and Associated DL-PDCH when no data is being transferred to the base station.

A further objective of the invention is to have the network node, typically the base station, make all the decisions of assigning and de-assigning uplink packet communication resources via the MAC controller residing in the network.

The uplink methodology provides an improvement to a code-division-multiple-access (CDMA) system employing spread-spectrum modulation. The CDMA system typically has a radio network controller (RNC) and a plurality of base stations, which serve a plurality of mobile or remote stations. Each base station (BS), has a BS-spread-spectrum transmitter and a BS-spread-spectrum receiver. Each mobile station (MS) has an MS-spread-spectrum transmitter and an MS-spread-spectrum receiver.

The concepts disclosed herein relate to methods of operations as well as base and mobile stations, for implementing the enhanced uplink. For example, from an overall perspective, the communications involve signaling and data communications exchanged between a base station and a mobile station. The MS-spread-spectrum transmitter of the one mobile station transmits a spread-spectrum signal, signifying a request to utilize an uplink channel. This request signal is received at the BS-spread-spectrum receiver, and processed to determine whether or not to grant the requested access. If access is to be granted, the BS-spread-spectrum transmitter sends a spread spectrum signal comprising a channel-request-granted message for the one mobile station. This channel-request-granted message contains a transmission start time parameter and specifies a transmission length. At the start time, the base station begins downlink signaling transmissions to the mobile station. A time after receiving the downlink signaling transmissions, at the mobile station, the MS spread-spectrum transmitter will start sending a spread spectrum signal containing packet data over the uplink channel. The mobile station will transmit packet data of no more than the specified length.

In several examples, the request-granted message and/or the subsequent control signaling transmissions may include one or more of Hybrid-ARQ (Automatic Repeat reQuest) information, data identifying an uplink modulation scheme, and an uplink channelization code related to an uplink physical dedicated channel assigned for use by the one mobile station.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the drawing figures, like reference numerals refer to the same or similar elements.

FIG. 14 is an uplink dedicated packet channel signal flow diagram with modified CPCH access procedure.

FIG. 15 is a functional block diagram of a spread spectrum remote or mobile station transceiver.

FIG. 16 is a functional block diagram of a spread spectrum base station transceiver.

FIG. 17 is a signal flow diagram illustrating an existing uplink dedicated packet channel.

DETAILED DESCRIPTION

The various concepts disclosed herein relate to networks, components and methods of operation thereof for providing an enhanced uplink channel capability, for wireless packet data communications. Reference now is made in detail to the examples illustrated in the accompanying drawings and discussed below. In understanding of these concepts, it may be helpful first to briefly consider the architecture of an exemplary network.

Figure 1:
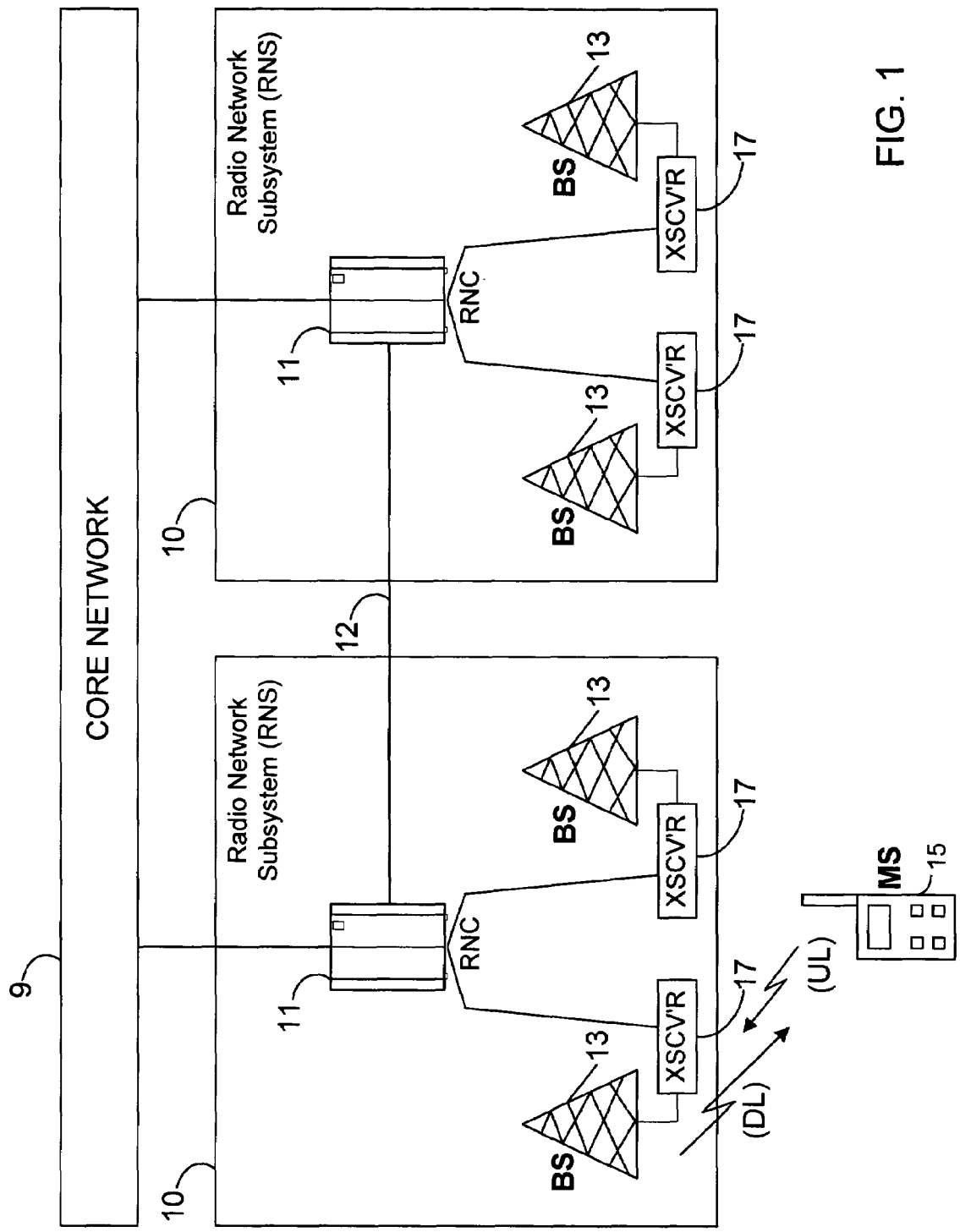
FIG. 1 is a functional block diagram of a simplified CDMA Terrestrial Radio Access network architecture, capable of implementing the enhanced uplink communications.

FIG. 1 illustrates one simplified example of a mobile wireless communication system, that may implement the enhanced dedicated uplink communications, for example, in the form of a simplified CDMA Terrestrial Radio Access network architecture. As such, FIG. 1 provides a relatively higher level illustration, with a core network 9 providing two-way communications to and from a plurality of radio network subsystems (RNSs) 10. The illustrated network includes a number of the Radio Network Subsystems (RNSs) 10, two of which are shown. The RNSs 10 typically provide mobile communication services in different geographic regions, although there may be some overlap, particularly, if the systems 10 are operated by competing service providers. The core network 9 provides communications between the RNS subsystems 10, for example, for transport of packet switched data and/or time-division multiplexed (TDM) voice information. Each RNS subsystem 10 comprises a radio network controller (RNC) 11, a plurality of base stations 13 serving a plurality of mobile stations 15. The RNCs 11 in the radio network subsystems 10 may be interconnected, for example by the line 12, for signaling and/or traffic communications in addition to those transported through the core network 9.

Each base station (BS) 13 has a BS-spread-spectrum transmitter and a BS-spread-spectrum receiver, shown together as a single transceiver (XSCV'R) system 17 for simplicity in this drawing. Each of the mobile stations (MS) 15 has an MS-spread-spectrum transmitter and an MS-spread-spectrum receiver forming a transceiver (not separately shown) that is complimentary to the transceivers 17. Exemplary transmitters and receivers for use in the MS and BS network elements are discussed in more detail below with regard to FIGS. 15 and 16.

In a typical embodiment offering packet switched data communications services, the radio network controllers (RNCs) 11 provide two-way packet switched data communications through the core 9 to a wide area network (not shown), for example a packet-switched network such as an Intranet and/or the public Internet. The RNCs 11, the core network 9 and the wide area packet network provide the MS units 15 with two-way packet data communications to and from an array of data communication devices, for example IP telephones, personal computers (PCs), host computers and servers. Although shown as handsets, the mobile stations 15 may be embodied as any user device that may conveniently incorporate or connect to an appropriate mobile/portable transceiver. Examples of other types of mobiles stations include but are not limited to personal digital assistants (PDAs), laptop PCs and handheld PCs.

The exemplary CDMA system provides a number of logically different channels for upstream and downstream communications over the airlink interface. Each channel is defined by one or more of the codes, for example the spreading code and/or the scrambling code. Several of the channels are common channels, but most of the channels are used for uplink or downlink packet communications between the base stations 13 and the mobile stations 15. As will be discussed, certain channels are signaling or control channels, whereas other channels carry the actual packet data traffic for users' communications services. Although some traffic channels of the CDMA network may be shared or common access channels, discussion here will focus of transport of traffic packets over dedicated channels, that is to say traffic channels that are allocated to a particular user or mobile station, and as such, are dedicated to that user or station for at least some time or length of transmission.

In operation, the RNC 11 measures traffic through the base stations 13 going to and from the mobile stations 15. In this way, the radio network controller (RNC) 11 monitors traffic demand in the illustrated network subsystem 10. The RNC 11 assigns physical channel resources to the mobile stations 15 within each cell of each base station 13. In general, each user's mobile station 15 continuously monitors the EP-DL-FACH channel. The EP-DL-FACH is a time-multiplexed channel, however, the slot location for the $i^{th}$ user is not predefined. A time-out timer will ensure a mobile station gives up on an over-due response from base station 13. This could be caused by errors on the Uplink. A mobile station 15 could monitor the activity on the EP-DL-FACH. Its access capabilities (probability of transmitting access packets) could be reduced in order to lower the aggregate uplink (UL) load. The node controlling the base station 13 could also periodically transmit the loading on the EP-UL-PDCH, in order to regulate the UL accesses. Multiple EP-DL-FACH channels could operate simultaneously. Similarly, multiple associated EP-DL-PSCCHs could operate simultaneously.

Figure 2:
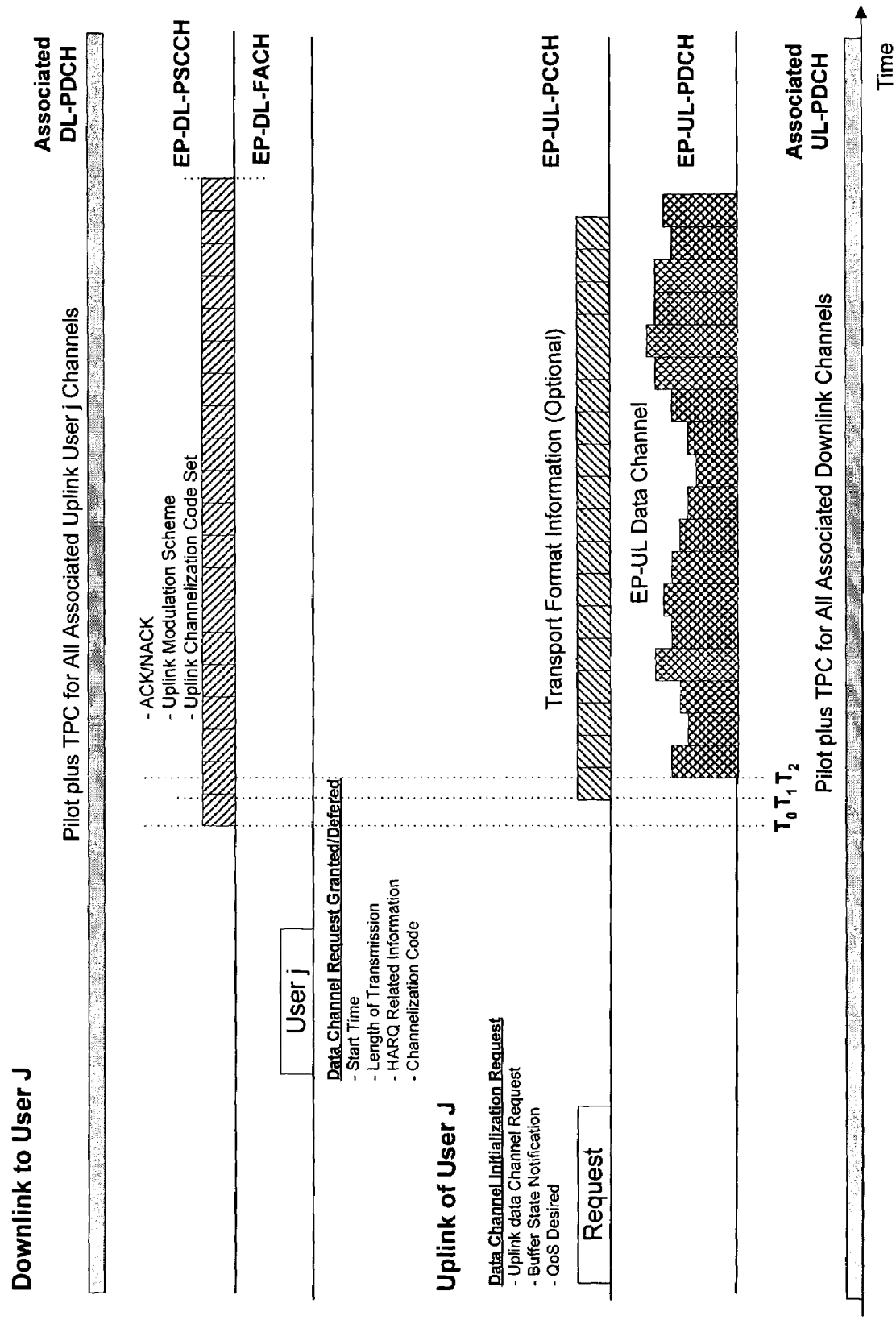
FIG. 2 is a basic enhanced uplink dedicated packet channel signal flow diagram.

FIG. 2 illustrates the signal flow between a mobile station 15 and a base station 13, implementing an enhanced packet (EP) uplink, using a packet transfer protocol (PTP). To appreciate the operations represented by the example, it may help first to briefly review the relevant channel nomenclature. Although the network (FIG. 1) may provide other types of channels, for purposes of this discussion, the transmission channel types in the example include: a PSCCH or "Packet Sharing Control CHannel," a PDCH or "Physical Dedicated CHannel," a PCCH or "Packet Control Channel," and a FACH or "Forward Access CHannel." To distinguish the direction of transmission, channels transmitted from a mobile station 15 to a base station 13 are designated as UL for UpLink channels, whereas channels transmitted from a base station 13 to a mobile station 15 are designated DL for DownLink channels. In both directions, channels providing enhanced packet-related services also are designated as EP channels, for purposes of this discussion.

Hence, the top line of the diagram (FIG. 2) shows the signals sent from a base station 13 on the associated downlink physical dedicated channel (associated DL-PDCH). The next line shows the signals sent from a base station 13 on the enhanced packet downlink Packet sharing control channel (EP-DL-PSCCH). The third line of the diagram shows the signals sent from a base station 13 on the enhanced packet downlink forward access channel (EP-DL-FACH). The lower three lines in the drawing represent uplink (UL) signals, on the enhanced packet uplink Packet Control Channel (EP-UL-PCCH), the enhanced packet uplink physical dedicated channel (EP-UL-PDCH) and the associated uplink physical dedicated channel (associated UL-PDCH).

As noted, in a CDMA type network, channels are defined by different codes used in the direct-sequence spread-spectrum processing of the transmitted signals. Hence, in the example of FIG. 2, there are three codes used for three uplink channels and three codes used for downlink channels. Of course, the base station my be sending and receiving on other code channels, e.g. for common channel communications, for common access communications with other mobile stations, and/or for dedicated communications with other mobile stations.

In this example, once a link is set up between a mobile station 15 of user j and a base station 13, the base station transmits power control signals over the associated downlink channel, e.g. the Associated DL-PDCH; and the mobile station transmits power control signals over an associated uplink channel, e.g. the Associated UL-PDCH. These transmissions provide two-way closed loop transmit power control. In accord with the present concepts, the mobile station 15 of user j will imitate the packet communication procedure by sending a data channel initialization request to the base station 13 through an uplink channel designed for control signaling associated with the data transmission, e.g. the EP-UL-PCCH in the illustrated example. The data channel initialization request is basically a request to allow this user, user j, to start an uplink transmission of the data packet(s), although the request may also contain other information such as the buffer state of the mobile station and the priority or quality of service desired for the uplink data transmission.

The network, upon receipt of the data channel initialization request by the base station 13, decides whether to grant the data channel to the requesting user. The decision may be performed by the RNC 11, by the base station or by another control node of the radio network subsystem (RNS) 10, although for convenience of discussion here, it is assumed that the decision functionality resides at the serving base station 13. If the base station decides to grant the request, it will send back a data channel request-granted message to the mobile station of the particular user, in this case for the user j. In the example, the base station 13 sends the data channel request-granted message for user j back over the downlink forward access channel (EP-DL-FACH). The data channel request-granted message contains the length of the allowed transmission and the scheduled start time of the transmission (T0), if T0 has not been determined beforehand. It can also contain other information that the mobile station needs to have for the data packet transfer, such as HARQ-related information and channelization code information.

The start time could be related to the time for start of the uplink transmission. However, in the example, at the allotted time T0, the base station will start transmission of at least control information pertinent to the uplink data packet transmission over a downlink shared control channel, e.g. the EP-DL-PSCCH, and the mobile station will start uplink transmission at a predetermined time thereafter. In the example, the control signaling transmission over the EP-DL-PSCCH includes one or more of "HARQ" or Hybrid-ARQ (Automatic Repeat reQuest) information, an uplink modulation scheme, and an uplink channelization code.

Hybrid ARQ is an implicit link adaptation mechanism. The amount of energy transmitted per packet of information depends on whether the channel is reliable during the transmission of the packet, by transmitting additional information about the packet once the received packet was considered to have been received in error. There are different types of HARQ. Chase combining involves the retransmission of the same coded packet. The receiver then combines the multiple received copies normally weighted by their received SNRs (signal to noise ratios).

For every received packet, the receiver provides an indication whether the packet was received correctly or not by transmitting back ACKs for correct packet receptions and NACKs for incorrect packet receptions. There are two main ways for transmitting ACK and NACK information to the receiver. One is selective-repeat (SR) and the other is stop-and-wait (SAW). Typically in SR, the transmitter sends a number of packets while waiting for a response (or lack thereof) about the correct or incorrect reception of the transmitted packets. Stop-and-Wait is one of the simplest forms of ARQ requiring very little overhead. In stop-andwait, the transmitter operates on the current packet until the packet has been correctly received. In the example, the mobile station is transmitting packets over an uplink channel, and the base station is sending the ACK/NACK signals, in this case, over the EP-DL-PSCCH.

In a typical network, the wireless communications may utilize a number of different modulation techniques, e.g. to support different data rates. Also, the network typically provides a number of channels for use as the UL-PDCH, and for each such channel there is a different channelization code. Hence, the base station 13 can direct the mobile station to use a particular modulation scheme and uplink channelization code for sending the data packet, by specifying an uplink modulation and channelization code in the data channel request-granted message. The ability to specify and change the modulation scheme and coding rate provides increased flexibility in adjusting the information data rate without greatly impacting the operation of the receiver. This is known as an explicit Link Adaptation (LA) mechanism and it is referred to as Adaptive Modulation and Coding (AMC).

As outlined above, the base station started transmission over the EP-DL-PSCCH for this user's communication session at the specified start time T0. At time T2, a pre-determined time after T0, the mobile station will begin its transmission of the data packet over the uplink channel. During the entire data packet transmission, the base station will continue sending back control information relating to the uplink data packet transmission over the shared downlink channel (on the EP-DL-PSCCH channel in this example). Based on the control information received over the shared downlink channel, the mobile station will adjust the modulation scheme and channelization code of the data packet transfer.

Optionally, at time T1, a pre-determined time between T0 and T2, the mobile station can also send over the other uplink channel (EP-UL-PCCH), which is designed for control signaling associated with the data transmission (EP-UL-PCCH), transport format information (TFI). The TFI can enable the base station receiver to determine the manner by which the transmitted data has been formatted into a packet. Both the transmitter and receiver know a predefined set of possible ways of formatting a packet. The mobile station transmitter sends the TFI along with the transmitted packet to the base station receiver.

In an alternative embodiment, the data channel initialization request from the mobile station (user j) may already contain the start time of the data transmission and length of transmission, and the mobile station will start its transmission at T0 without any data channel request-granted message from the base station.

Figure 3:
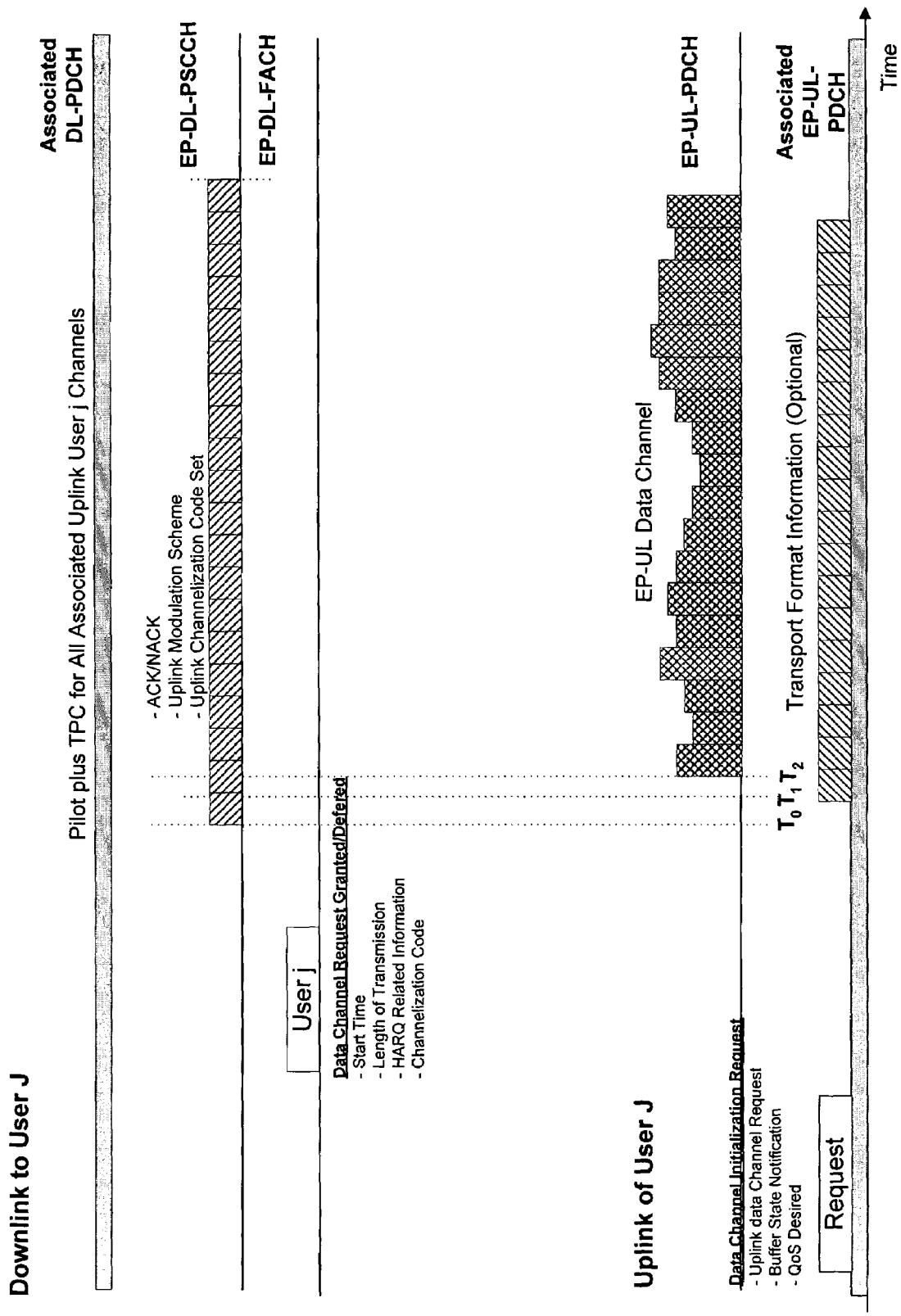
FIG. 3 is a basic enhanced uplink dedicated packet channel signal flow diagram where a PDCH is used to carry all signaling and control information.

In practice, it is possible that the uplink power control channel (e.g. the Associated UL-PDCH) and the uplink control-signaling channel (e.g. the UL-PCCH) are the same channel. The use of different names of the channels in this example is for separation and easy understanding of their functionality only. The different functionality can well be carried on a common physical channel, to reduce hardware and channel resource requirements, etc., as illustrated in FIG. 3.

Figure 4:
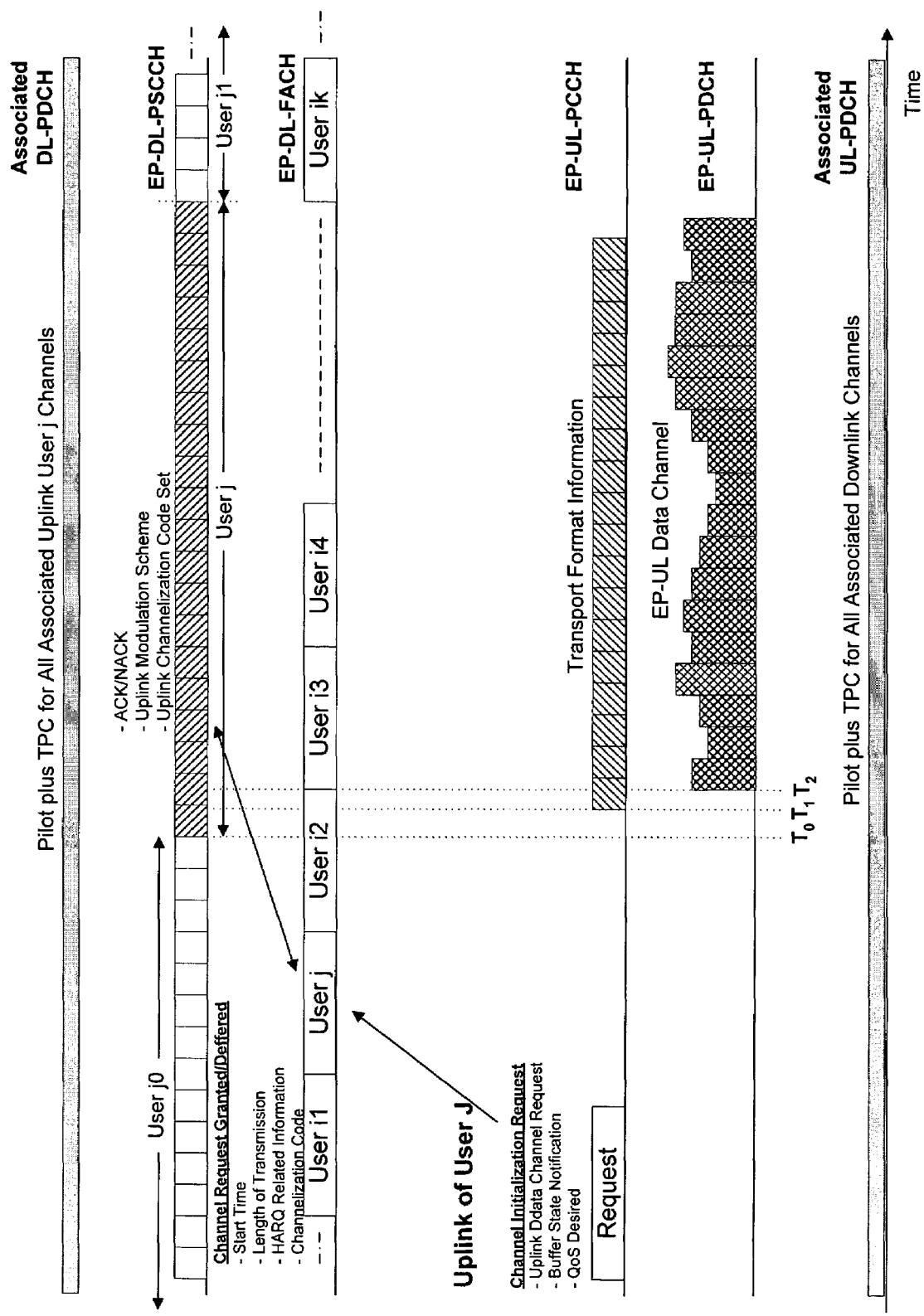
FIG. 4 is an enhanced uplink dedicated packet channel signal flow diagram showing transmission from the base station for multiple users.

FIG. 4 is an enhanced uplink dedicated packet channel system block diagram showing transmission from the base station 13 for multiple users' mobile stations 15. Like the earlier example of FIG. 2, the multiple user example, utilizes three downlink code channels from the base station to the mobile station and three uplink code channels from the mobile stations to the base station. The downlink channels include the associated physical dedicated channel (associated DL-PDCH), the enhanced packet downlink Packet Sharing Control CHannel (EP-DL-PSCCH) and the enhanced packet downlink forward access channel (EP-DL-FACH). The uplink (UL) channels include the enhanced packet uplink Packet Control Channel (EP-UL-PCCH), the enhanced packet uplink physical dedicated channel (EP-UL-PDCH) and the associated uplink physical dedicated channel (associated UL-PDCH).

In this example, each user is allocated usage for some amount of time, and use by or for the user j appears as slots on respective channels. For example, on the EP-DL-PSCCH channel transmissions intended for the user j follow those for user j0 and precede those for user j1. The transmissions on the EP-DL-FACH may not follow the same order, as this channel carries signaling that may not lead to communications on the EP-DL-PSCCH and UP-UL-PDCH channels, for example, to tell certain users' mobile stations to defer a requested communication.

However, once a link is set up between a mobile station 15 of user (e.g. user j) and a base station 13, the base station transmits power control signals over an associated downlink channel, e.g. the Associated DL-PDCH, and the mobile station transmits power control signals over an associated uplink channel, e.g. Associated UL-PDCH. In accord with the present concepts, the mobile station will then send a data channel initialization request to the base station through an uplink channel designed for control signaling associated with the data transmission, e.g. the EP-UL-PCCH in the illustrated example. The data channel initialization request is basically a request to allow this user, user j, to start an uplink transmission of the data packet(s), although the request may also contain other information such as the buffer state of the mobile station and the priority or quality of service desired for the uplink data transmission.

The base station 13, upon receiving the data channel initialization request decides whether to grant the data channel to the requesting user. If the base station decides to grant the request, it will send back a data channel request-deferred message. However, if the base station decides to grant the request, it will send back a data channel request-granted message to the mobile station of the particular user, in this case user j, on the EP-DL-FACH channel in this example. The data channel request-granted message contains the length of the allowed transmission and the scheduled start time of the transmission (T0), if T0 has not been determined beforehand. It can also contain other information that the mobile station needs to have for the data packet transfer, such as HARQ-related information, modulation scheme and/or channelization code information.

At the allotted time T0, the base station 13 will start transmission over a downlink shared control channel, e.g. the EP-DL-PSCCH, and this transmission will include control information pertinent to the uplink data packet transmission. In the example, the control information contains the "HARQ" or Hybrid-ARQ information, an uplink modulation scheme, and an uplink channelization code. For every received packet, the base station receiver provides an indication whether the packet was received correctly or not by transmitting back ACKs for correct packet receptions and NACKs for incorrect packet receptions. In this example, the base station 13 transmits the ACK/NACK signaling on the EP-DL-PSCCH channel.

At time T2, a pre-determined time after T0, the mobile station will begin its transmission of the data packet. During the entire data packet transmission, the base station will continue sending back control information relating to the uplink data packet transmission over the shared downlink channel (on the EP-DL-PSCCH channel in this example). Based on the control information received over the shared downlink channel, the mobile station will adjust the modulation scheme and channelization code of the data packet transfer. The mobile station also adjusts its packet transmissions as needed, e.g. to re-send packets that have not been properly received, based on receipt of the ACK/NACK signaling on the EP-DL-PSCCH channel.

Figure 5:
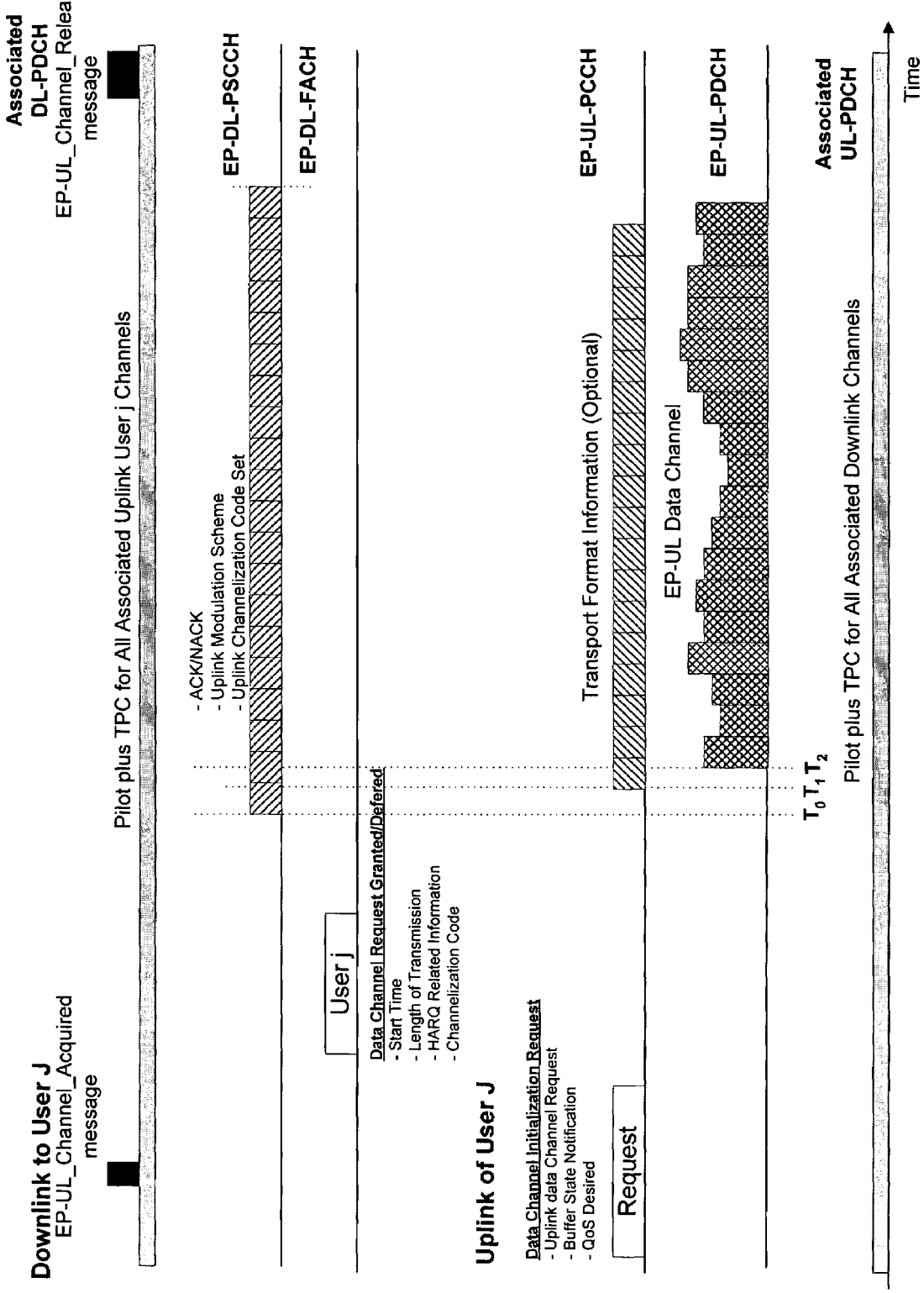
FIG. 5 is an uplink dedicated packet channel signal flow diagram with a channel acquire message.

FIG. 5 shows another embodiment of the enhanced packet channel communications, in this case, where an optional channel-acquired message is sent by the base station to the mobile station to indicate that the base station has acquired the Associated UL-PDCH.

Figure 6:
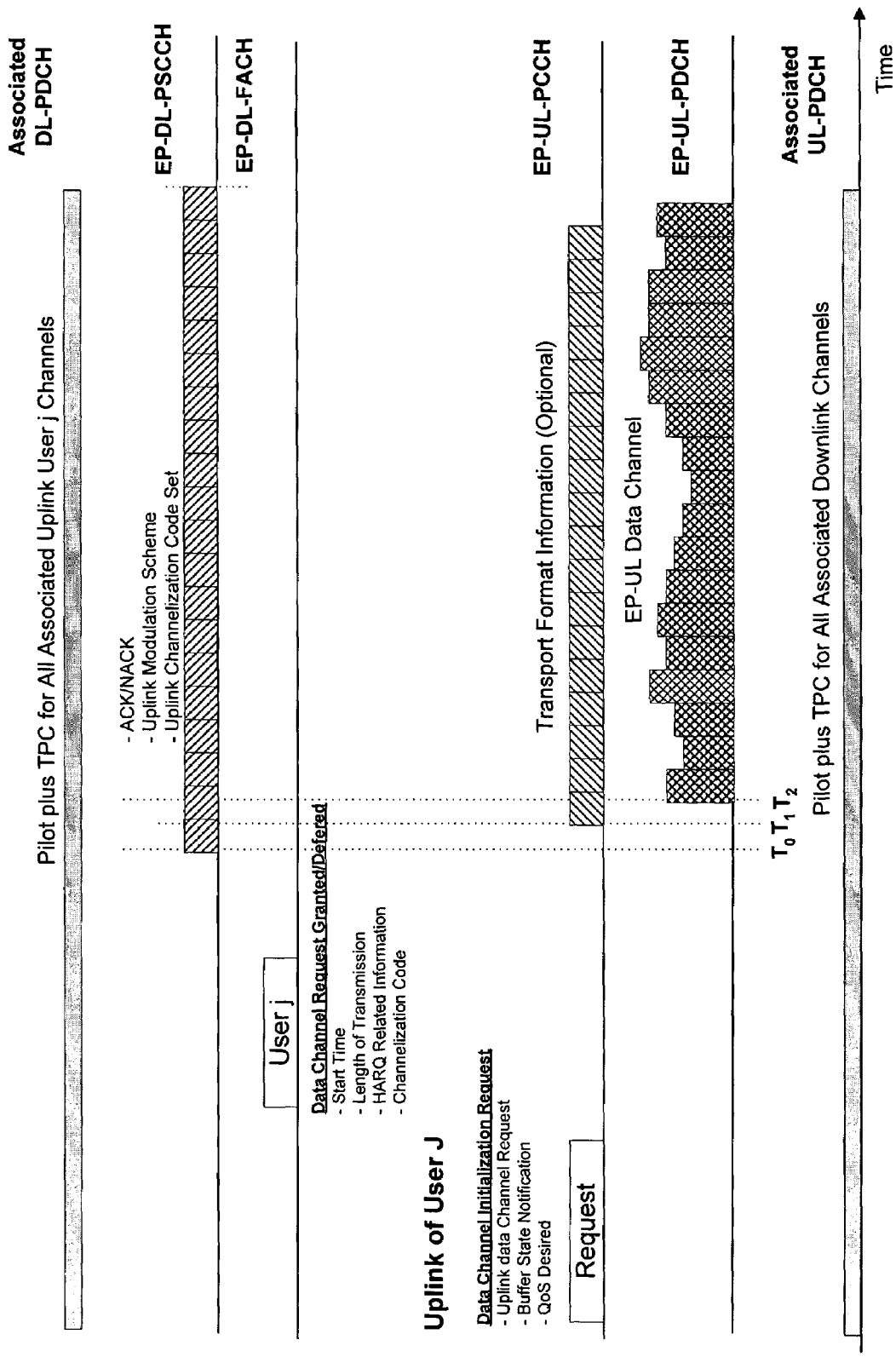
FIG. 6 is an uplink dedicated packet channel signal flow diagram with immediate release.

FIG. 6 shows yet another embodiment, where the Associated UL-PDCH and Associated DL-PDCH are immediately released after the scheduled data transmission. Specifically, the data channel request-granted message specifies an allotted length of transmission. The channel resources are released for reassignment to a mobile station immediately after the end of the allocated transmission. In the example, the transmission length is specified as a time (duration from start or a specific end time), however, those skilled in the art that the transmission length could be specified in other terms, for example, amount of data (e.g. number of packets).

Figure 7:
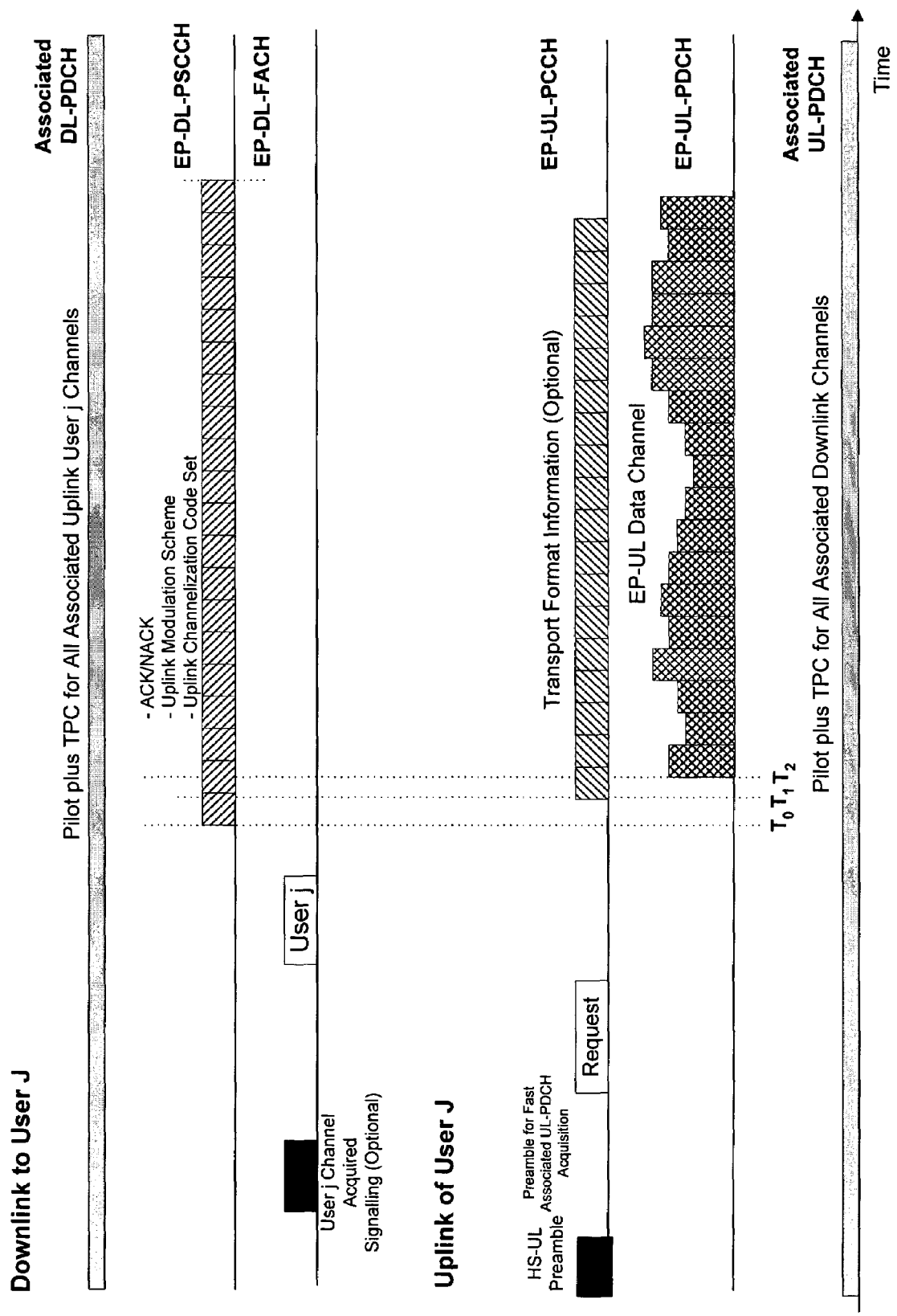
FIG. 7 is an uplink dedicated packet channel signal flow diagram with an uplink preamble.

FIG. 7 shows yet another embodiment, where an optional preamble or header is added before the transmission over the Associated UL-PDCH in order to facilitate earlier detection of such Associated UL-PDCH by the base station.

Figure 8:
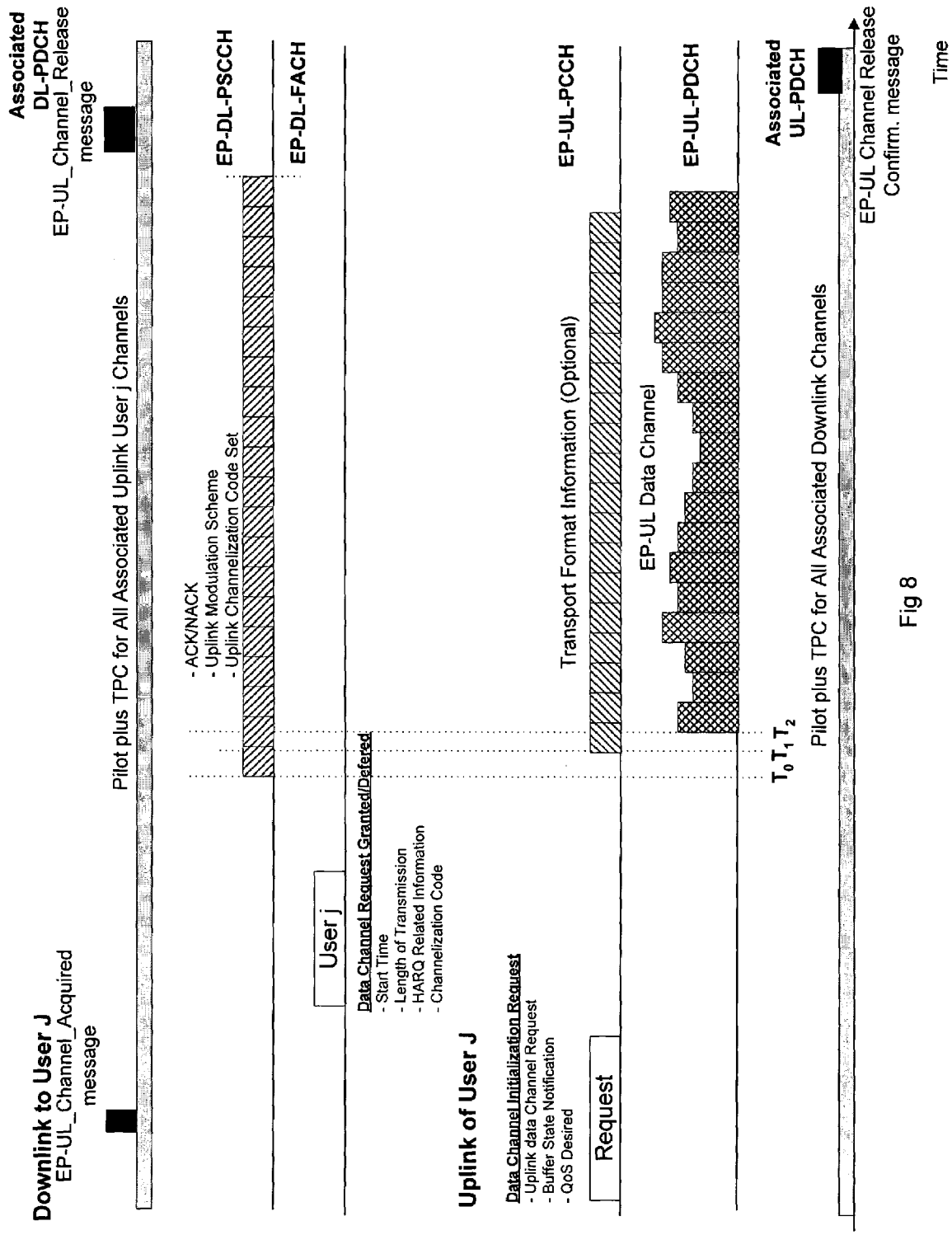
FIG. 8 is an uplink dedicated packet channel signal flow diagram with a channel release message.

FIG. 8 shows yet another embodiment of the invention where a channel release message is sent by the base station to the mobile station at a pre-determined time after the end of the control information transmission.

Figure 9:
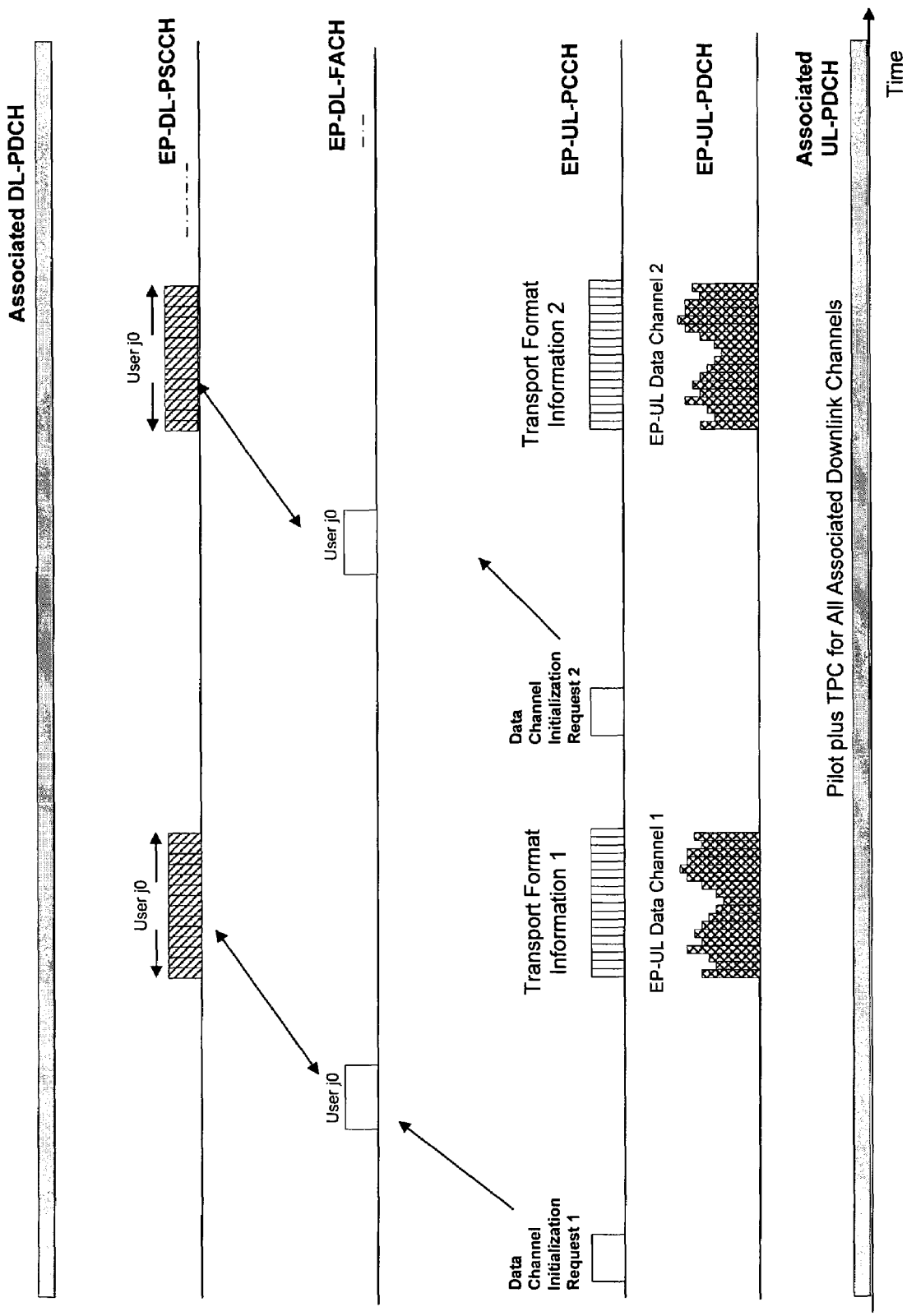
FIG. 9 is an enhanced uplink dedicated packet channel signal flow diagram with multiple data packet transfer.

FIG. 9 shows the basic enhanced uplink dedicated packet channel method when multiple data packets are sent during the same link.

Figure 9A:
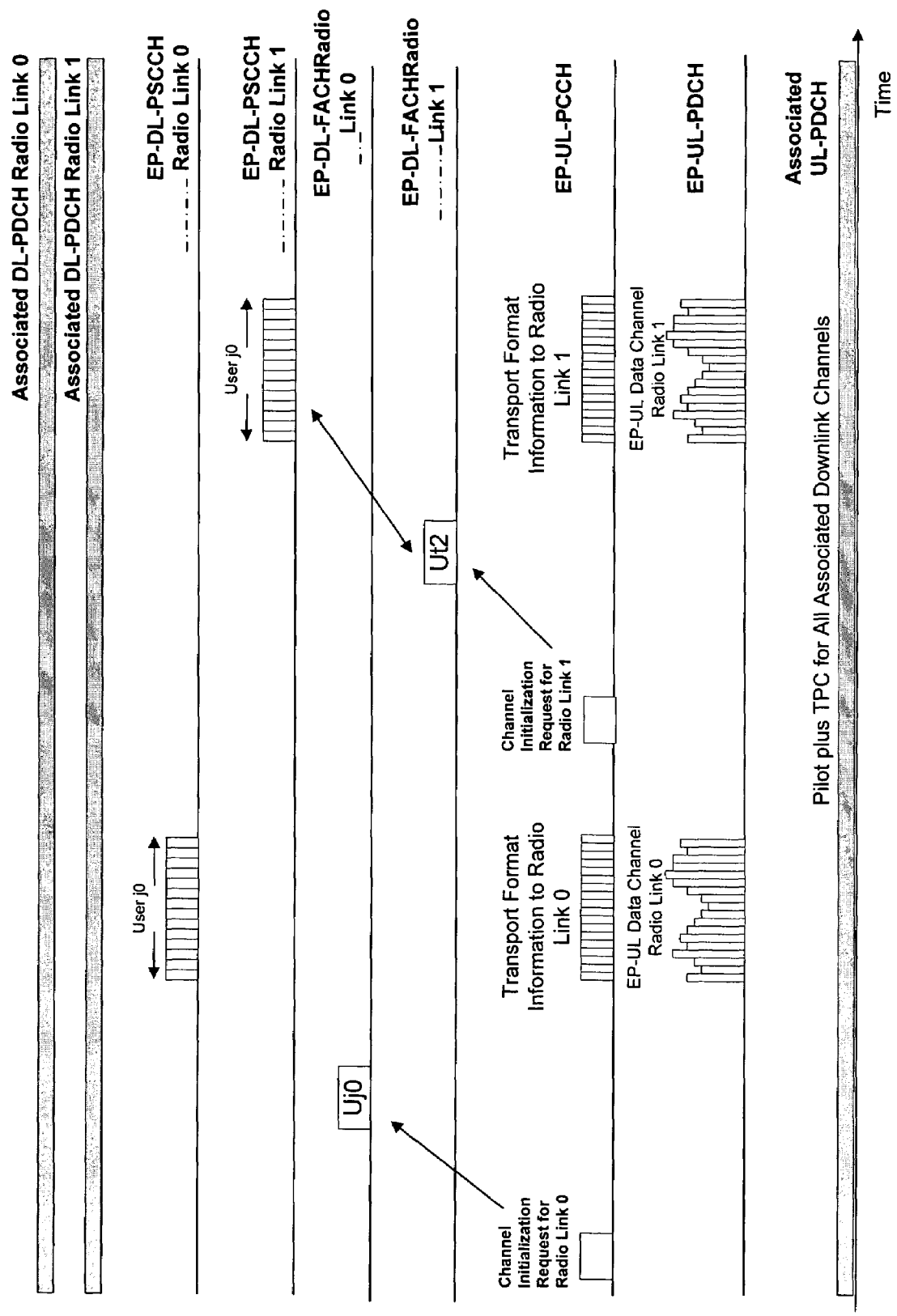
FIG. 9a is an enhanced uplink dedicated packet channel signal flow diagram with multiple data packet transfer via different radio links.

In FIG. 9a, two packet data transfers are implemented via the use of a two Different Radio Links. After the MS completed a packet data transfer over Radio Link 0, Radio Link 1 became more reliable for uplink transmissions. The RS then send a Channel_Initialization_Request to Radio Link 1. Radio Link 1 responds over its own EP-DL-FACH.

Figure 10:
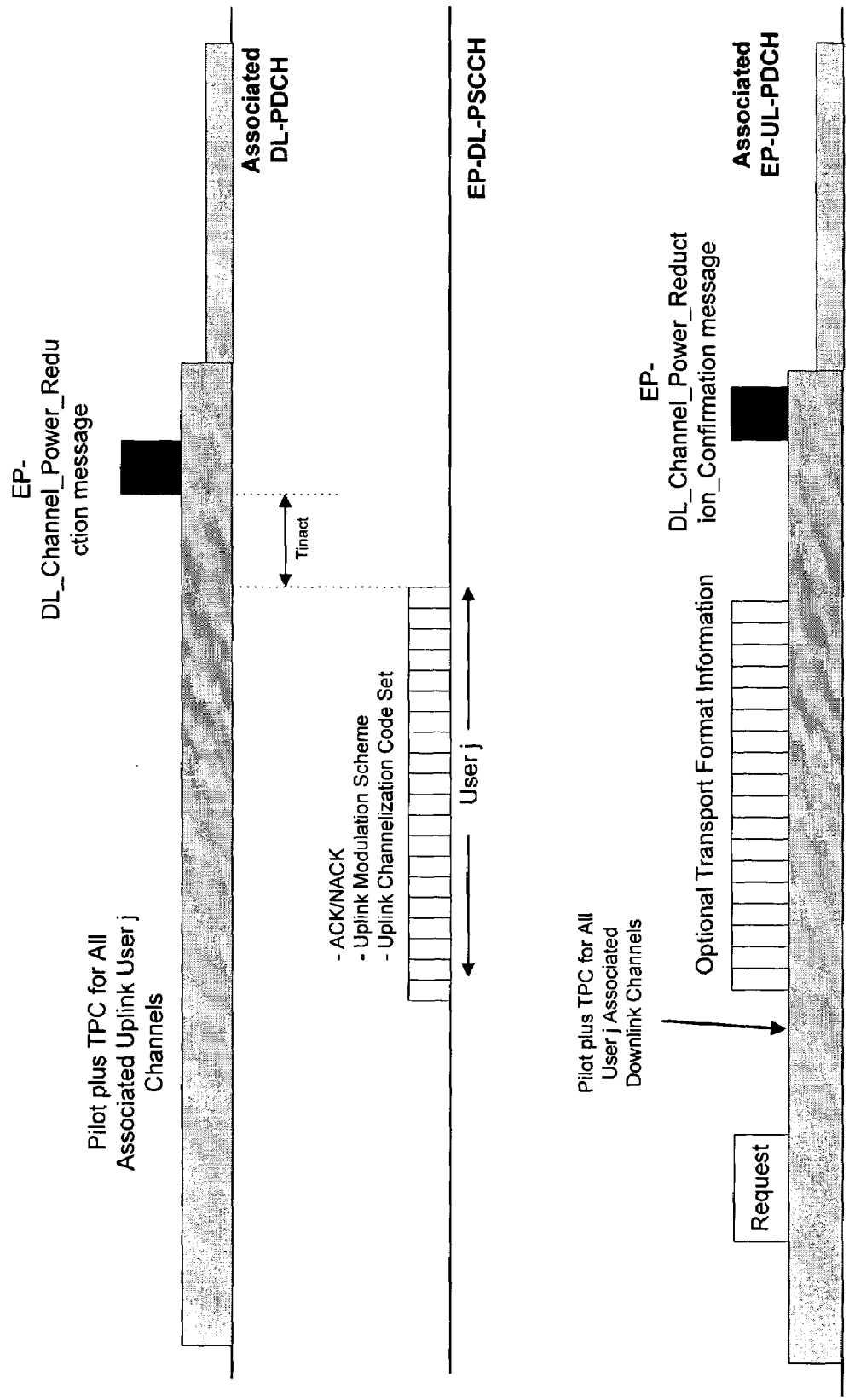
FIG. 10 is an uplink dedicated packet channel signal flow diagram with a channel power reduction message.

In FIG. 10, a new mechanism to reduce the power of the control channels (the overhead) is introduced. This power control method can be applied to the enhanced uplink discussed above or to other systems or methods. With this power control technique, after a certain inactivity time $T_{inact}$ following the transmission of the control information from the base station (or in other methods, after the end of the data packet), the base station will send a power reduction message to the mobile station and ask the mobile station is instruct the base station to reduce power. Upon receipt of the power reduction message, the mobile station will send back a power reduction confirmation message, after which both the mobile station and the base station will instruct each other to lower their power of transmission of their control channels. For simplicity of illustration, FIG. 10 does not show the uplink data channel and has combined the power control channel with the signaling control (see description for FIG. 3).

Figure 11:
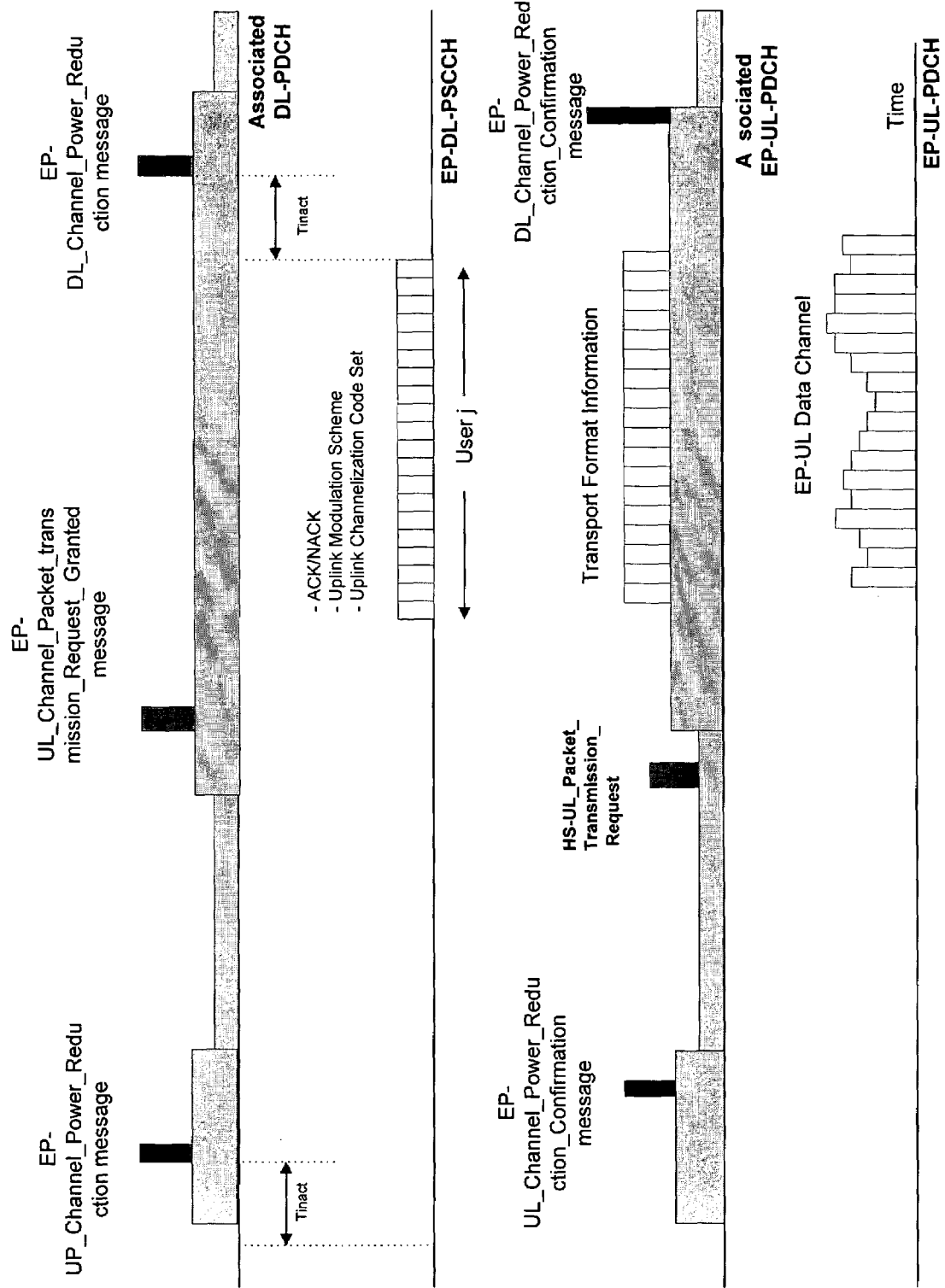
FIG. 11 is an uplink dedicated packet channel signal flow diagram with channel power resumption requested by mobile station.

In FIG. 11, you can see how the data channel request subsequent to the power reduction in the control channels is used also as a power resumption request. When the mobile station 15 sends out the data channel request, it at the same time instructs the base station 13 to increase its power of the downlink (DL) power control channel. When the data message channel granted message is sent by the base station, the mobile station also instructs the mobile station to increase its power of the uplink (UL) power control channel. After the data packet is sent and a certain inactivity time $T_{inact}$, the mobile station and the base station can go to the power reduction stage again.

Figure 12:
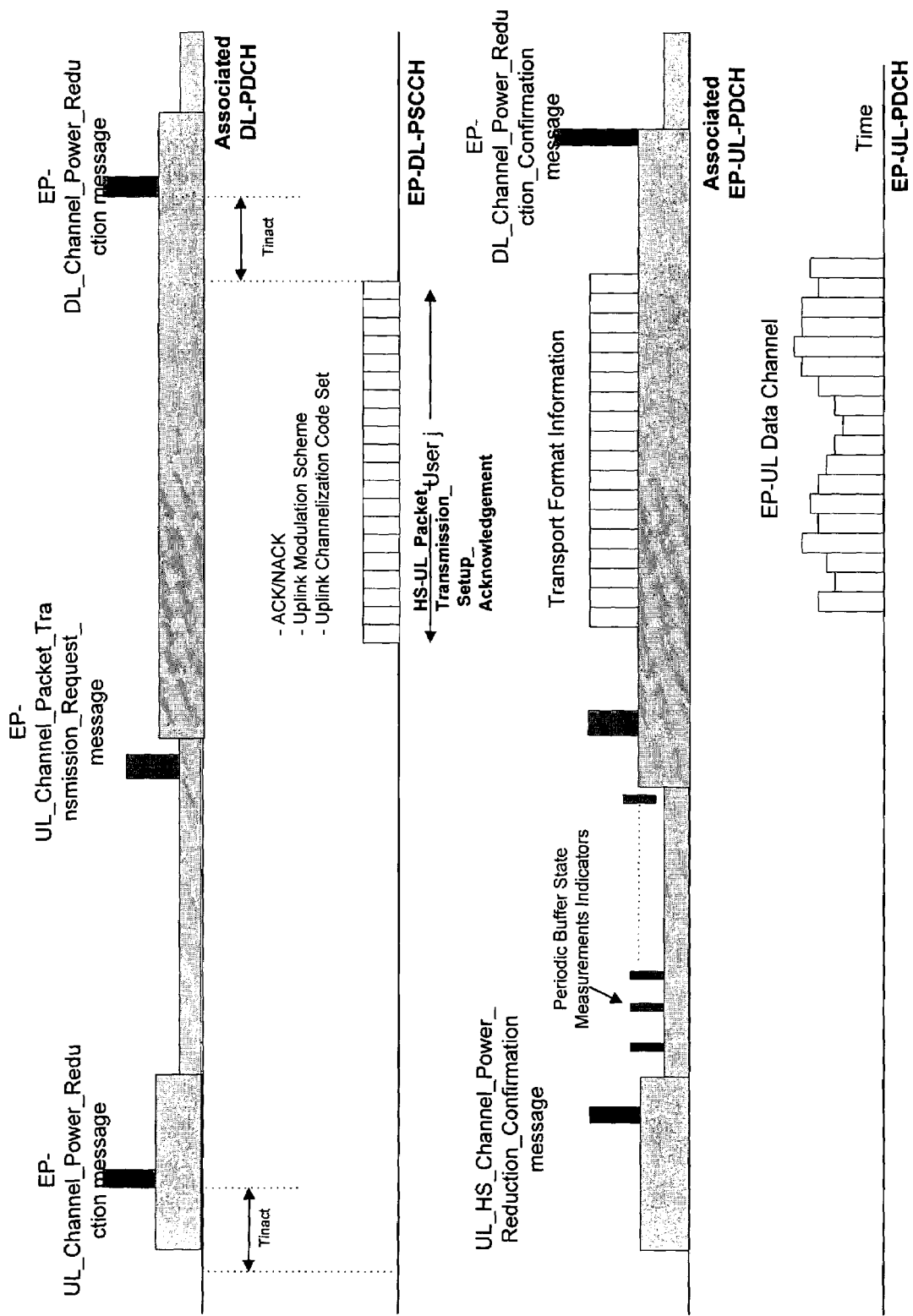
FIG. 12 is an uplink dedicated packet channel signal flow diagram with channel power resumption requested by base station

Alternatively, as in FIG. 12, while the control channel power is reduced, the mobile staion can send these periodic Buffer State Measurements Indicators to the base station. When a Buffer State Measurements Indicator indicates that the data in the buffer of the MS has exceeded a certain threshold, the base station will then send out a data packet transmission request message to the mobile station to instruct the mobile station to send a data packet and resume power of the UL power control channel. The mobile station will send back a confirmation message and also resume power of the DL power control channel.

Figure 13:
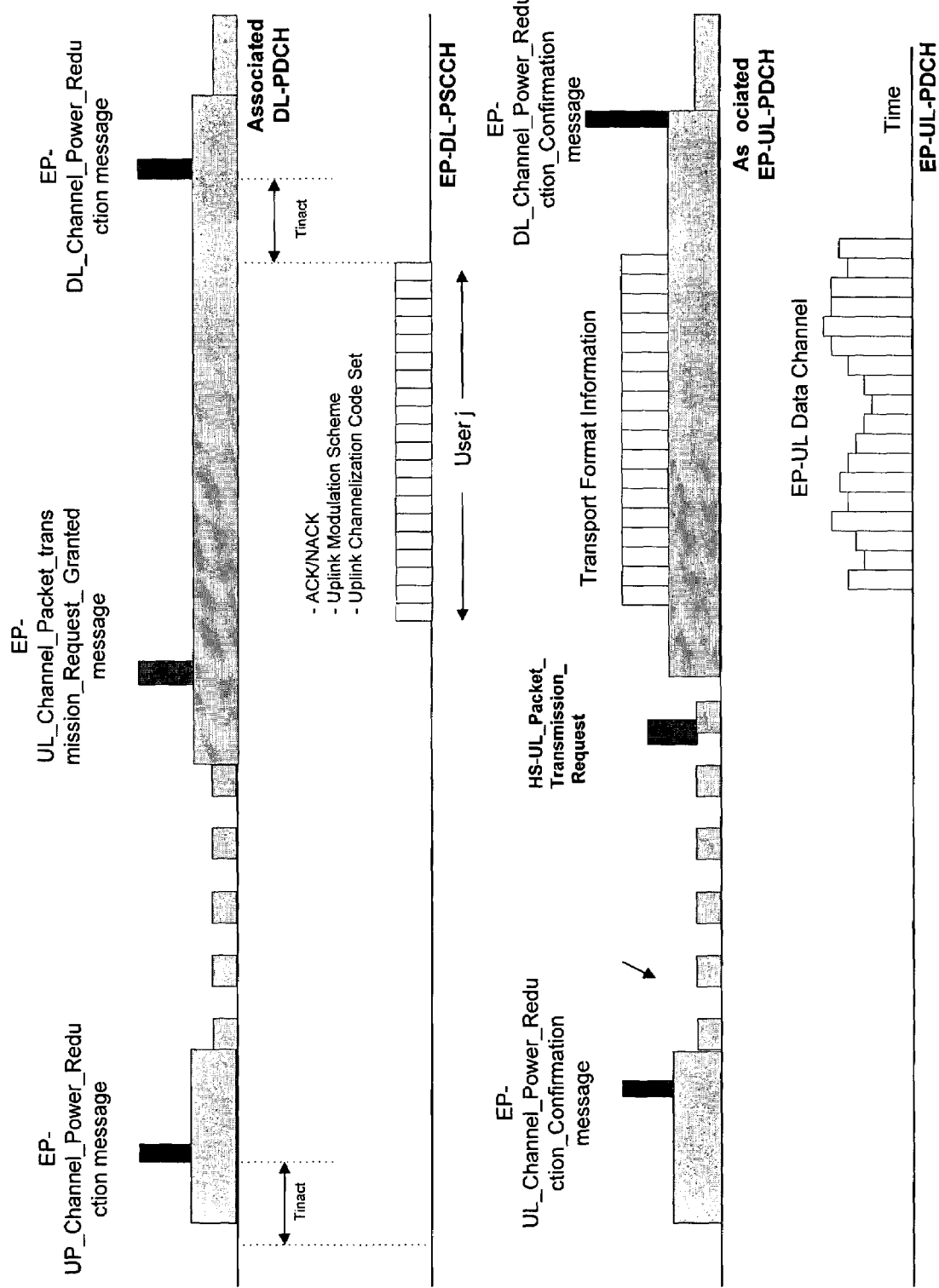
FIG. 13 is an uplink dedicated packet channel signal flow diagram with a channel power reduction and power resumption with gating as the reduction mode.

Similarly, instead of reducing power in the power control channels as in FIGS. 10-12 after the reduction message, the reduction can be in the form of gated transmission of the power control channels, as in FIG. 13.

FIG. 14 teaches the use of a modified Common Packet Channel (CPCH) approach to for initial link set up. The link request resides in the CPCH message. The link acknowledgment comes down in the CPCH downlink instead of via FACH.

FIGS. 15 and 16 illustrate elements of the stations, in an example of the system of FIG. 1. For purposes of this discussion here, it will be assumed that the examples of FIGS. 1, 15 and 16 implement a processing technique such a one of those shown in FIG. 2 or 4.

FIG. 15 illustrates an example of a MS spread-spectrum transmitter and MS spread-spectrum receiver, essentially in the form of an MS base-band processor 207 for performing the PHY layer functions and an interface 208 for performing the MAC layer functions, of the transceiver at a mobile station 15.

The MS spread-spectrum receiver includes an antenna 209 coupled to a circulator 210, a receiver radio frequency (RF) section 211, a local oscillator 213, a quadrature demodulator 212, and an analog-to-digital converter 214. The receiver RF section 211 is coupled between the circulator 210 and the quadrature demodulator 212. The quadrature demodulator is coupled to the local oscillator 213 and to the analog to the digital converter 214. The output of the analog-to-digital converter 214 is coupled to a programmable-matched filter 215. An receiver 216 for the associated downlink physical dedicated channel (Associated DL-PDCH), a receiver 217 for the enhanced packet downlink packet sharing control channel (EP-DL-PSCCH) and a receiver 218 for the enhanced packet downlink forward access channel (EP-DL-FACH) are coupled to the programmable-matched filter 215. A controller 219 is coupled to the receiver's 216, 217 and 218. The controller 219 of the MS base-band processor 207 in turn connects to the interface 208, for exchange of necessary signaling control information and data. For example, in the upstream direction, the control 219 passes received data to the interface 208 for MAC layer processing and communication thereof to the higher layer elements within or connected to the mobile station 15.

The interface 208 also outputs uplink (UL) data (EP-UL-DATA). The MS spread-spectrum transmitter includes a forward-error-correction (FEC) encoder 222 for encoding this downlink data. The encoder 222 also provides encoding for the Hybrid Automatic Repeat reQuest (HARQ) signal. The FEC/HARQ encoder 222 is coupled through an interleaver 223 to a QAM modulator 224. The controller 219 controls the operation of the FEC/HARQ encoder 222 and the interleaver 223. The controller 219 also provides various signaling and/or control data to one or more modulators 225. In the mobile station, these signals include preamble signals and the TFI signal, discussed above. The outputs from the modulators 224 and 225 are added in a combiner 226.

A spreading-sequence generator 227 is coupled to a product device 226, which receives the combined downlink information (modulated) from the combiner 226. A digital-to-analog converter 229 is coupled between the product device 228 and a quadrature modulator 230. The quadrature modulator 230 is coupled to the local oscillator 213 and supplies a modulated analog output signal to an transmitter RF section 231. The transmitter RF section 231 is coupled to the circulator 210 so as to provide an RF single of the appropriate power level to the antenna for wireless transmission over the air to one or more base stations 13.

The controller 219 has control links coupled to the analog-to-digital converter 214, the programmable-matched filter 215, the receivers 216, 217 and 218, the digital-to-analog converter 229, the spreading sequence generator 227, the combiner 226, the interleaver 223, the and the FEC/HARQ encoder 222.

A received spread-spectrum signal from antenna 209 passes through circulator 210 and is amplified and filtered by the receiver RF section 211. The local oscillator 213 generates a local signal, which the quadrature demodulator 212 uses to demodulate in-phase and quadrature phase components of the received spread-spectrum signal. The analog-to-digital converter 214 converts the in-phase component and the quadrature-phase component to digital signals. These functions are well known in the art, and variations to this block diagram can accomplish the same functions.

The programmable-matched filter 215 despreads the received spread-spectrum signal components. A correlator, as an alternative, may be used as an equivalent means for despeading the received spread-spectrum signal.

The DL-PDCH receiver 216 detects pilot and TPC (transmit power control) signaling in the received spread-spectrum signal. The EP-DL-PSCCH receiver 217 detects the various channel control signaling (ACK/NACK, modulation, code set, HARQ, etc.) in the received spread-spectrum signal. The EP-DL-FACH receiver 218 detects and processes the request-granted/deferred messages on the DL-FACH channel in the received spread-spectrum signal. Detected data and signaling from the downlink are outputted from the controller 219 to the interface 208, and the interface passes the data to the higher layer elements in or associated with the MS 15.

The higher level elements of the mobile station (and/or a device connected to the mobile station) supply uplink (UL) data and control information to the interface 208. In the MS transceiver, the MAC layer elements, typically in the interface 208, supply data and signaling information, intended for uplink transmission, to the input of the FEC/HARQ encoder 222. The signaling and data are FEC encoded by the FEC encoder 222, interleaved by the interleaver 223 and QAM modulated at 224. The combiner 226 produces a combined modulated stream, containing the modulated uplink data from modulator 224 and the modulated signaling (preamble and TFI) and control from modulators 225 and supplies that stream to the product device 226. The stream is spread-spectrum processed by the product device 226, with a selected spreading chip-sequence from the spreading-sequence generator 227. The spread uplink stream is converted to an analog signal by the digital-to-analog converter 228, and in-phase and quadrature-phase components are generated by the quadrature modulator 230 using a signal from local oscillator 213. The modulated downlink packet is translated to a carrier frequency, filtered and amplified by the transmitter RF section 231, and then it passes through the circulator 210 and is radiated by antenna 209.

FIG. 16 illustrates an example of a base station spread-spectrum transmitter and a BS spread-spectrum receiver, essentially in the form of a BS base-band processor 307 for performing the PHY layer functions and an interface 308 for performing the MAC (media access control) layer functions, of the base station transceiver 17 at a base station 13.

The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 314 is coupled to a programmable-matched filter 315. A receiver 316 for the associated uplink channel (UL-PDCH), a receiver 317 for the enhanced packet uplink physical dedicated channel (EP-UL-PDCH) and a receiver 318 for the enhanced packet uplink packet control channel (EP-UL-PCCH) are coupled to the programmable-matched filter 315. A controller 319 is coupled to the receiver's 316, 317 and 318. The controller 319 of the BS base-band processor 307 in turn connects to the interface 308, for exchange of necessary signaling control information and data. For example, in the upstream direction, the control 319 passes received data to the interface 308 for MAC layer processing and communication thereof to the higher layer elements at or within the network.

The interface 308 also outputs downlink (DL) data (EP-DL-DATA). The BS spread-spectrum transmitter includes a forward-error-correction (FEC) encoder 322 for encoding this downlink data. The encoder 322 also provides encoding for the Hybrid Automatic Repeat reQuest (HARQ) signal. The FEC/HARQ encoder 322 is coupled through an interleaver 323 to a QAM modulator 324. The controller 319 controls the operation of the FEC/HARQ encoder 322 and the interleaver 323. The controller 319 also provides various signaling and/or control data to one or more modulators 325. The outputs from the modulators 324 and 325 are added in a combiner 326.

A spreading-sequence generator 327 is coupled to a product device 326, which receives the combined downlink information (modulated) from the combiner 326. A digital-to-analog converter 329 is coupled between the product device 328 and a quadrature modulator 330. The quadrature modulator 330 is coupled to the local oscillator 313 and supplies a modulated analog output signal to an transmitter RF section 331. The transmitter RF section 331 is coupled to the circulator 310 so as to provide an RF single of the appropriate power level to the antenna for wireless transmission over the air to one or more mobile stations.

The controller 319 has control links coupled to the analog-to-digital converter 314, the programmable-matched filter 315, the receivers 316, 317 and 318, the digital-to-analog converter 329, the spreading sequence generator 327, the combiner 326, the interleaver 323, the and the FEC/HARQ encoder 322.

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despeading the received spread-spectrum signal.

The associated UL-PDCH receiver 316 detects pilot and TPC signaling in the received spread-spectrum signal. The EP-UL-PDCH receiver 317 detects the enhanced uplink packet transmissions in the received spread-spectrum signal. The EP-UL-PCCH receiver 318 detects the transmission format information (optional) of the received spread-spectrum signal. Detected data and signaling from the uplink channels are outputted from the controller 319 to the interface 308, and the interface passes the data to the higher layer elements in or associated with the base station 13 and through the link to the RNC 11.

The RNC 11 supplies data and signaling over a link to the base station. In the BS transceiver, the MAC (mead access control) layer elements, typically in the interface 308, supply downlink (DL) data and signaling information, intended for downlink transmission, to the input of the FEC/HARQ encoder 322. The signaling and data are FEC encoded by the FEC encoder 322, interleaved by the interleaver 323 and QAM modulated at 324. The combiner 326 produces a combined modulated stream, containing the modulated downlink data from modulator 324 and the modulated signaling and control from modulators 325 and supplies that stream to the product device 326. The stream is spread-spectrum processed by the product device 326, with a selected spreading chip-sequence from the spreading-sequence generator 327. The spread downlink stream is converted to an analog signal by the digital-to-analog converter 328, and in-phase and quadrature-phase components are generated by the quadrature modulator 330 using a signal from local oscillator 313. The modulated downlink packet is translated to a carrier frequency, filtered and amplified by the transmitter RF section 331, and then it passes through the circulator 310 and is radiated by antenna 309.

The following is a summary of the HS-UL_Packet-Mode Basic Operation Attributes. The mobile station 15 requests an Enhanced Packet Uplink (EP-UL) connection through a random access channel (RACH) or common packet channel (CPCH). The network node (base station 15 and/or RNC 11) determines whether there are uplink resources available and allows of disallows the mobile station an uplink connection, as indicated by a request-granted or request-deferred message sent back through a forward access channel (FACH). If the resources are granted, the network node relays the parameters of the Associated DL-PDCH through the FACH.

If connection is granted, both the mobile station 15 and the network node enact an EP (Enhanced Packet) associated PDCH channel or EP-UL-PDCH. The EP-UL-PDCH parameters are either explicitly relayed via RACH/CPCH signaling or implicitly via the UE-ID over the RACH/CPCH. The network node could optionally send an EP-UL_Channel_Acquired message to the mobile station. This could be a simple an all 1's sequence for a predetermined time interval. After a predetermined time offset from the reception of the EP-UL_Channel_Acquired message or the acquisition of the A_DL_PDCH, the mobile station sends its Channel_Initialization_Request.

The network node will respond within a predetermined time interval with a message over the EP-DL-FACH, directed towards that user's mobile station, only with specific information about the HS_UL transmission. The specific parameters could include Start of Transmission, Time Duration of Transmission (End of Transmission), HARQ related information like type of combining and Channelization Code Set information. Flexibility could be given to the mobile station to choose from a subset of possible channelization codes and transmission packet formats.

The Uplink packet transmission could be deferred to a later time if network node determines that the requested resources are not currently available. By deferring the packet transmission, the network node might or might not be required to assign UL channels to the mobile station. If an assignment to a deferred transmission does not arrive within a predetermined time interval, the mobile station will try a channel initialization request again.

An UL_HS_Channel_Release message could be sent at any time over the Associated DL-PDCH or the EP-DL-FACH. All UL-HS associated transmissions are discontinued immediately.

After transmission of the Channel_Request_Granted message from the network, the network node will start transmitting the information on the EP-DL-PSCCH for that mobile station, relative to the Start Time relayed to the UE over the EP-DL-FACH. This information could include (but is not limited to) ACK/NACKs, Uplink Modulation scheme and the Uplink Channelization Code Set. This is information generated in response to the channel measurements made by receiving the Associated EP-UL-PDCH or the Associated UL-PDCH.

In response to the information received over the EP-DL-PSCCH, the mobile station will generate packets of transport formats within the allowed subset as defines by the EP-DL-PSCCH. The specific Transport Format information used by the mobile station to transport its packets is transmitted over the EP-UL-PCCH or the Associated EP-UL-PDCH. The Transport Format information for each transmitted packet could be transmitted ahead or earlier than the transmitted packet.

The Uplink Packet Data is transmitted over the EP_UL_PDCH. The Transport Format chosen is dictated in part by the EP-DL-PSCCH. The EP-UL-PDCH is transmit power controlled by the Associated DL-PDCH. The EP-UL-PDCH is transmitted at a constant power offset in dB relative to the Associated UL-PDCH or the control part of the Associated EP-UL-PDCH.

The control part of the Associated UL_PDCH or the Associated EP-UL-PDCH power controls the Associated DL-PDCH. All transmissions to the mobile station from EP-DL-FACH and EP-DL-PSCCH are being power controlled implicitly by being transmitted at a relative power offset in dB relative to the power transmitted over the Associated DL-PDCH which is power controlled by the Associated UL-PDCH or the control part of the Associated EP-UL-PDCH.

An EP-DL_Channel_Power_Reduction_Message transmitted by the network node, over either the Associated DL-PDCH or the EP-DL-FACH, signals the mobile station to decrease the power level requirements on the received Associated DL-PDCH.

An EP-UL_Channel_Power_Reduction_Confirmation_Message transmitted by the mobile station over either the Associated UL-PDCH or the Associated EP-UL-PDCH signals network that EP-DL_Channel_Power_Reduction_Message has been received and that the mobile station will decrease the power level requirements on the received Associated DL-PDCH. Also, network node will automatically decrease the power level requirements on the received Associated UL-PDCH or the Associated EP-UL-PDCH.

Measurements of the mobile station buffer data size can be transmitted to base station and/or the RNC, either over the Associate UL-PDCH or the Associated EP-UL-PDCH.

While in the power saving mode, the mobile station could request an uplink packet transmission by sending an EP-UL_Packet_Transmission_Request. The network node could respond positively by sending an EP-UL_Packet_Transmission_Request Granted message. Both the mobile station and the network node then change their received power level requirements on the transmitted Associated DL-PDCH and Associated EP-PDCH or Associated UL-PDCH control parts.

The above process could be initiated by a base station transmission of an EP-UL_Channel_Packet_Transmission_Request message. The mobile station will respond with an EP-UL_Packet_Transmission_Setup_Acknowledgement.
Both base station and the mobile station are appropriately taken out of their power saving modes.

An enhanced packet synchronization preamble (EP-SP) could be used to enable the base station an easier synchronization to the Associated EP-UL_PDCH or the Associated UL-PDCH channels. This preamble could be transmitted over its own Enhanced Packet-Synchronization Preamble Channel (EP-SPCH). The timing of the received EP-SP could then be used to obtain the timing of the Associated EP-UL_PDCH or the Associated UL-PDCH channels.

The RS while operating in a Soft Handoff mode, could request an UL packet transmission to different base stations for different UL packet transfers.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. In a code-division-multiple-access (CDMA) system employing spread-spectrum modulation comprising a base station (BS) comprising a BS-spread-spectrum transmitter and a BS-spread-spectrum receiver, and at least one mobile stations (MS) comprising an MS-spread-spectrum transmitter and an MS-spread-spectrum receiver, a method comprising the steps of:

transmitting from the MS-spread-spectrum transmitter of the one mobile station a spread-spectrum signal signifying a request to utilize an uplink channel;

receiving the request to utilize the uplink channel from the one mobile station at the BS-spread-spectrum receiver;

processing the received request to determine whether or not to grant the requested access;

if the processing results in a determination to grant access, transmitting from the BS-spread-spectrum transmitter a spread spectrum signal comprising a channel-request-granted message for the one mobile station, the channel-request-granted message comprising control information specifying a transmission start time and a transmission length;

receiving the channel-request-granted message from the base station at the MS-spread-spectrum receiver the one mobile station;

at the specified transmission start time, initiating transmission from the BS-spread-spectrum transmitter of a spread spectrum signal comprising control signaling related to the granted access over a downlink channel;

receiving the spread spectrum signal comprising control signaling at the MS-spread-spectrum receiver the one mobile station;

at a predetermined time after the specified transmission start time, starting transmission of a spread spectrum signal containing packet data over the uplink channel from the MS-spread-spectrum transmitter of the one mobile station, in a manner in accord with the received control information;

ceasing the transmission of the spread spectrum signal containing packet data over the uplink channel from the mobile station, upon completion of transmission of packet data of the specified transmission length; and transmitting from the MS-spread-spectrum transmitter of the one mobile station a spread-spectrum signal containing format information, wherein the transmission signal containing the format information begins between the specified transmission start time and the predetermined time after the specified start time.

2. The method of claim 1, wherein when the transmission of the spread spectrum signal containing packet data over the uplink channel ceases, the uplink physical dedicated channel is immediately released.

3. The method of claim 1, wherein the channel-request-granted message further comprises at least one of Hybrid-ARQ (Automatic Repeat reQuest) information, data identifying an uplink modulation scheme, and an uplink channelization code related to an uplink physical dedicated channel assigned for use by the MS spread-spectrum transmitter of the one mobile station.

4. The method of claim 1, wherein:

the transmitting of the spread spectrum signal comprising the channel-request-granted message utilizes a downlink forward access channel; and transmission from the BS-spread-spectrum transmitter of a spread spectrum signal comprising control signaling related to the granted access uses a downlink packet sharing channel.

5. The method of claim 4, wherein control information comprises at least one of Hybrid-ARQ (Automatic Repeat reQuest) information, data identifying an uplink modulation scheme, and an uplink channelization code related to the transmission by the one mobile station on the uplink physical dedicated channel.

6. The method of claim 1, wherein the transmitting of the spread-spectrum signal containing format information utilizes an uplink packet control channel.

7. The method of claim 1, wherein the uplink channel is a physical dedicated channel.

8. The method of claim 1, wherein the uplink channel is a common packet channel.

9. The method of claim 1, wherein the request to utilize the uplink channel comprises control information specifying a state of a buffer of the one mobile station or a quality of service level desired for the requested access.

10. In a wireless code-division-multiple-access (CDMA) spread-spectrum communication network comprising a base station for serving one or more mobile stations, a method comprising:

transmitting a data channel initialization request, for access to an uplink channel, to the base station from one mobile station;

receiving a channel-request-granted message at the one mobile station, the channel-request-granted message comprising control information specifying a start time and a transmission length;

after the specified start time, receiving control signaling related to the requested access at the one mobile station;

transmitting packet data from the one mobile station over the uplink channel of the specified transmission length, beginning at a time following initial reception of the control signaling; and transmitting format information associated with the packet data from the one mobile station, following receiving of the control signaling and before beginning the transmitting of the packet data over the uplink channel.

11. The method of claim 10, wherein the uplink channel comprises a physical dedicated channel.

12. The method of claim 11, wherein the transmitting of the format information utilizes an uplink packet control channel.

13. The method of claim 11, wherein:
the channel-request-granted message is received over a downlink forward access channel; and
the control signaling related to the requested access is received over a downlink packet sharing control channel.

14. A mobile station for use in a code-division-multiple-access (CDMA) system employing spread-spectrum modulation, the mobile station (MS) comprising:

an MS-spread-spectrum transceiver system, for transmitting and receiving spread-spectrum modulated signals to and from a mobile station; and a media access control interface, coupled to the MS-spread-spectrum transceiver system, for receiving and sending packet data for the mobile station through the MS-spread-spectrum transceiver system, and for controlling signaling communications of the MS-spread-spectrum transceiver system in support of wireless communications operations of the mobile station through with a base station of the CDMA system, such that in operation, the mobile station is for performing the following sequence of operations:

transmitting a data channel initialization request, for access to an uplink channel, to the base station from one mobile station;

receiving a channel-request-granted message at the one mobile station, the channel-request-granted message comprising control information specifying a start time and a transmission length;

after the specified start time, receiving control signaling related to the requested access at the one mobile station;

transmitting packet data from the one mobile station over the uplink channel of the specified transmission length, beginning at a time following initial reception of the control signaling; and transmitting format information associated with the packet data from the one mobile station, following receiving of the control signaling and before beginning the transmitting of the packet data over the uplink channel.

15. The mobile station of claim 14, wherein the MS-spread-spectrum transceiver system comprises a base band processor.

16. A mobile station for use in a code-division-multiple-access (CDMA) system employing spread-spectrum modulation, the mobile station (MS) comprising:

an MS-spread-spectrum transceiver system comprising a base band processor, for transmitting and receiving spread-spectrum modulated signals to and from a mobile station, wherein the base band processor comprises:

a spread-spectrum transmitter;

a spread spectrum receiver; and a controller, responsive to signals from the spread-spectrum receiver and the media access control interface, for controlling operations of the spread-spectrum transmitter; and a media access control interface, coupled to the MS-spread-spectrum transceiver system, for receiving and sending packet data for the mobile station through the MS-spread-spectrum transceiver system, and for controlling signaling communications of the MS-spread-spectrum transceiver system in support of wireless communications operations of the mobile station through with a base station of the CDMA system, such that in operation, the mobile station is for performing the following sequence of operations:

transmitting a data channel initialization request, for access to an uplink channel, to the base station from one mobile station;

receiving a channel-request-granted message at the one mobile station, the channel-request-granted message comprising control information specifying a start time and a transmission length;

after the specified start time, receiving control signaling related to the requested access at the one mobile station; and transmitting packet data from the one mobile station over the uplink channel of the specified transmission length, beginning at a time following initial reception of the control signaling, wherein the spread-spectrum transmitter transmits format information associated with the packet data from the one mobile station to the base station via the uplink packet control channel.

17. The mobile station as in claim 16, wherein the spread-spectrum transmitter transmits the channel request message on an uplink packet control channel.

* * * * *